US012798691B2

(12) United States Patent
Banks, Jr. et al.

(10) Patent No.: US 12,798,691 B2
(45) Date of Patent: Nov. 17, 2026

(54) TAILGATE DEACTIVATION SYSTEM

(71) Applicant: Banks Morrison Innovations, LLC, Archer Lodge, NC (US)

(72) Inventors: James E. Banks, Jr., Clayton, NC (US); Michael A. Morrison, Archer Lodge, NC (US)

(73) Assignee: BANKS MORRISON INNOVATIONS, LLC, Archer Lodge, NC (US)

( * ) Notice: Subject to any disclaimer, the term of this patent is extended or adjusted under 35 U.S.C. 154(b) by 0 days.

(21) Appl. No.: 19/246,838

(22) Filed: Jun. 24, 2025

(65) Prior Publication Data

US 2025/0313280 A1 Oct. 9, 2025

Related U.S. Application Data

(63) Continuation-in-part of application No. 19/188,528, filed on Apr. 24, 2025, now Pat. No. 12,377,918, (Continued)

(51) Int. Cl.
*E05F 15/73* (2015.01)
*B62D 33/027* (2006.01)
(Continued)

(52) U.S. Cl.
CPC .......... *B62D 33/0273* (2013.01); *E05F 15/60* (2015.01); *H01H 13/50* (2013.01); (Continued)

(58) Field of Classification Search
CPC ................. B60R 16/03; E05Y 2201/22; E05Y 2800/106; B60O 1/0088
See application file for complete search history.

(56) References Cited

U.S. PATENT DOCUMENTS 4,826,199 A 5/1989 Chambers
8,201,869 B1 6/2012 Butlin, Jr. et al.
(Continued)

FOREIGN PATENT DOCUMENTS

DE 102005054494 A1 5/2007
DE 102005055002 A1 5/2007
(Continued)

OTHER PUBLICATIONS

Declaration of Jonathan B. Hogins in Support of the Request for Ex Parte Reexamination, Jan. 30, 2026, pp. 1-51, Exhibit 1006 to Reexamination Request of U.S. Pat. No. 12,240,533.
(Continued)

*Primary Examiner* — Menatoallah Youssef
*Assistant Examiner* — Esayas G Yeshaw
(74) *Attorney, Agent, or Firm* — COATS & BENNETT, PLLC

(57) ABSTRACT

A tailgate deactivation system prevents collisions between a multi-panel tailgate comprising a primary gate panel and an inner gate panel, and an object, such as a towing apparatus. The system detects the object in a hazard space that the inner gate panel would occupy when the primary gate panel is in an open position and the inner gate panel is unlatched. In response to detecting the object in the hazard space and the primary gate panel being unlatched, the inner gate panel is disabled from unlatching by interrupting power flow to an unlatching actuator of the inner gate panel. Several technologies are described for detecting the object in the hazard space.

27 Claims, 13 Drawing Sheets

AUTO OVERRIDE SWITCH

Related U.S. Application Data which is a continuation of application No. 18/944,073, filed on Nov. 12, 2024, now Pat. No. 12,291,283, which is a continuation of application No. 18/816,813, filed on Aug. 27, 2024, now Pat. No. 12,240,533, which is a continuation of application No. 18/325,661, filed on May 30, 2023, now abandoned, which is a continuation of application No. 17/514,831, filed on Oct. 29, 2021, now Pat. No. 11,702,148, which is a continuation of application No. 16/816,441, filed on Mar. 12, 2020, now Pat. No. 11,161,555.

(60) Provisional application No. 62/935,231, filed on Nov. 14, 2019, provisional application No. 62/896,878, filed on Sep. 6, 2019.

(51) Int. Cl.
*E05F 15/60* (2015.01)
*H01H 13/50* (2006.01)

(52) U.S. Cl.
CPC ..... *E05Y 2201/434* (2013.01); *E05Y 2400/60* (2013.01); *E05Y 2900/546* (2013.01); *H01H 2231/026* (2013.01)

(56) References Cited

U.S. PATENT DOCUMENTS

| | | | | |
|---|---|---|---|---|
| 9,056,535 | B2 | 6/2015 | Materna et al. | |
| 10,000,950 | B2 | 6/2018 | Sandler | |
| 10,941,602 | B2 * | 3/2021 | Ghannam | B60Q 1/543 |
| 11,220,301 | B2 * | 1/2022 | Robinson | B62D 33/0273 |
| 11,890,905 | B2 | 2/2024 | Muddasani et al. | |
| 12,188,279 | B2 | 1/2025 | Komaromi et al. | |
| 2007/0009656 | A1 | 1/2007 | Nagase et al. | |
| 2018/0080265 | A1 | 3/2018 | Sandler | |
| 2019/0185074 | A1 | 6/2019 | Morley et al. | |
| 2019/0249479 | A1 * | 8/2019 | Lewis | B62D 33/0273 |
| 2020/0141171 | A1 * | 5/2020 | Ghannam | B60Q 1/543 |
| 2020/0148283 | A1 * | 5/2020 | Robinson | B62D 33/03 |
| 2022/0372791 | A1 * | 11/2022 | Morrison | E05B 17/0012 |

FOREIGN PATENT DOCUMENTS

| | | | |
|---|---|---|---|
| DE | 102012209048 | A1 | 12/2013 |
| DE | 102005055002 | B4 | 5/2024 |
| DE | 102012209048 | B4 | 10/2024 |

OTHER PUBLICATIONS

Declaration of Timothy Pierce, Mar. 13, 2026, pp. 1-9, Exhibit 1007 to Request for Ex Parte Reexamination of U.S. Pat. No. 12,240,533.

Excerpts of Sierra 1500 Service Manual 13131286, 2025, uploaded from Internet on Oct. 8, 2025, pp. 1-375, General Motors, Exhibit 1008 to Request for Ex Parte Reexamination of U.S. Pat. No. 12,240,533.

Declaration of David MacGillis, Jan. 27, 2026, pp. 1-4, Exhibit 1009 to Request for Ex Parte Reexamination of U.S. Pat. No. 12,240,533.

Techlink, "2019 Sierra 1500 MultiPro Tailgate", Aug. 2018, vol. 20, No. 15, pp. 1-4, Exhibit 1010 to Request for Ex Parte Reexamination of U.S. Pat. No. 12,240,533.

Lopez, J., "GMC Sierra MultiPro Tailgate Hits Hitch When Fully Extended: Video," GMAUTHORITY, Jan. 24, 2019, pp. 1-12, Exhibit 1014 to Request for Ex Parte Reexamination of U.S. Pat. No. 12,240,533.

Second Amended Complaint for Patent Infringement, filed Aug. 5, 2025, pp. 1-47, *Banks Morrison Innovations, LLC* v. *General Motors LLC*, Civ. Action No. 2:25-422 (E.D.Tex.), Exhibit 1017 to Request for Ex Parte Reexamination of U.S. Pat. No. 12,240,533.

D.I. 28-6, "U.S. Pat. No. 12,240,533 patent infringement claim chart attached to Second Amended Complaint for Patent Infringement", filed Aug. 5, 2025, pp. 1-22, *Banks Morrison Innovations, LLC* y. *General Motors LLC*, Civ. Action No. 2:25-422 (E.D. Tex.), Exhibit 1018 to Request for Ex Parte Reexamination of U.S. Pat. No. 12,240,533.

D.I. 27-2,"U.S. Pat. No. 12,377,918 patent infringement claim chart attached to Second Amended Complaint for Patent Infringement", filed Aug. 5, 2025, pp. 1-12, *Banks Morrison Innovations, LLC* y. *General Motors LLC*, Civ. Action No. 2:25-422 (E.D. Tex.), Exhibit 1018 to Request for Ex Parte Reexamination of U.S. Pat. No. 12,377,918.

D.I. 28-4, "U.S. Pat. 11,702,148 patent infringement claim chart attached to Second Amended Complaint for Patent Infringement", filed Aug. 5, 2025, pp. 1-10, *Banks Morrison Innovations, LLC* y. *General Motors LLC*, Civ. Action No. 2:25-422 (E.D. Tex.), Exhibit 1018 to Request for Ex Parte Reexamination of U.S. Pat. No. 11,702,148.

D.I. 28-8, "U.S. Pat. No. 12,291,283 patent infringement claim chart attached to Second Amended Complaint for Patent Infringement", filed Aug. 5, 2025, pp. 1-17, *Banks Morrison Innovations, LLC* y. *General Motors LLC*, Civ. Action No. 2:25-422 (E.D. Tex.), Exhibit 1018 to Request for Ex Parte Reexamination of U.S. Pat. No. 12,291,283.

Cadillac, "Cadillac 1994 Owner's Literature, The 1994 Sedan Deville Literature", General Motors Corp., 1993, pp. 1-399, Obtained from Internet: https://www.dezosmanuals.com/wp-content/uploads/2021/07/1994-Cadillac-Deville.pdf, Exhibit 1019 to Request for Ex Parte Reexamination of U.S. Pat. No. 12,240,533.

Edmunds, "1997 Oldsmobile Silhouette Review", 1997 Oldsmobile Silhouette Review & Ratings, Edmunds, obtained Jan. 21, 2026, pp. 1-10, obtained from Internet: https:/www.edmunds.com/oldsmobile/silhouette/1997/review/, Exhibit 1020 to Request for Ex Parte Reexamination of U.S. Pat. No. 12,240,533.

Edmunds, "2019 Edmunds CES Tech Driven Awards", Edmunds, Feb. 26, 2019, pp. 1-8, obtained on Jan. 13, 2026, obtained from Internet: https://www.edmunds.com/roadnoise/awards/tech-driven.html, Exhibit 1020 to Request for Ex Parte Reexamination of U.S. Pat. No. 12,291,283.

GMC, "Acadia/Acadia Denali Owner's Manual", 2017, General Motors LLC, 2016, pp. 1-418, Exhibit 1022 to Request for Ex Parte Reexamination of U.S. Pat. No. 12,240,533.

* cited by examiner

PLUG-N-PLAY WIRE HARNESS

AUTO OVERRIDE SWITCH

AUTO OVERRIDE SWITCH

MANUAL OVERRIDE SWITCH

MANUAL OVERRIDE SWITCH

MANUAL OVERRIDE SWITCH

TAILGATE DEACTIVATION SYSTEM

RELATED APPLICATIONS

This application is a Continuation-In-Part of U.S. patent application Ser. No. 19/188,528, filed Apr. 24, 2025, which is a continuation of U.S. patent application Ser. No. 18/944,073, filed Nov. 12, 2024 and issued as U.S. Pat. No. 12,291,283, which is a continuation of U.S. patent application Ser. No. 18/816,813, filed on Aug. 27, 2024 and issued as U.S. Pat. No. 12,240,533 on Mar. 3, 2025, which is a continuation of U.S. patent application Ser. No. 18/325,661, filed on May 30, 2023, which is a continuation of U.S. patent application Ser. No. 17/514,831, filed on Oct. 29, 2021 and issued as U.S. Pat. No. 11,702,148 on Jul. 18, 2023, which is a continuation of U.S. patent application Ser. No. 16/816,441, filed on Mar. 12, 2020 and issued as U.S. Pat. No. 11,161,555 on Nov. 2, 2021, which claims the benefit of U.S. Provisional Application No. 62/896,878, filed on Sep. 6, 2019, and U.S. Provisional Application No. 62/935,231, filed on Nov. 14, 2019, the disclosures of all of which are hereby incorporated herein by reference in their entireties.

FIELD OF THE DISCLOSURE

The present disclosure relates generally to vehicles, and in particular to a tailgate deactivation system for multi-panel tailgates.

BACKGROUND

A recent innovation of tailgates on vehicles such as pickup trucks is a multi-panel tailgate, comprising a primary gate panel that pivots, with respect to the vehicle, between closed (vertical) and open (horizontal) positions, and an inner gate panel that pivots, with respect to the primary gate panel, between closed (coplanar) and open (perpendicular) positions. Both gate panels are latched in their respective closed positions, and pivot upon being unlatched. In particular, when the primary gate panel is in the open (horizontal) position, the inner gate panel may pivot downward towards a vertical orientation. In this position, the inner gate panel extends below the plane of the open primary gate panel, and hence below the plane of the truck bed. In this case, the inner gate panel may impact a towing apparatus (or other object) attached to the vehicle, causing damage to the tailgate and/or the towing apparatus.

Prior art approaches to mitigate this hazard include disabling unlatching of the primary gate panel when a towing apparatus is detected. However, forcing the multi-panel tailgate to remain in the closed (vertical) position whenever a towing apparatus is attached severely limits the utility of the vehicle. Many pickup truck owners, who routinely tow trailers, boats, and the like, leave the towing apparatus attached to the vehicle even when not towing a vehicle, and need to operate at least the primary gate panel in order to access the bed of the truck.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present disclosure described and claimed herein, a tailgate deactivation system prevents collisions between a multi-panel tailgate, comprising a primary gate panel and an inner gate panel, and an object, such as a towing apparatus. The system detects the object in a hazard space that the inner gate panel may occupy when the primary gate panel is in the open position and the inner gate panel is unlatched. In response to detecting the object in the hazard space and the primary gate panel being unlatched, the inner gate panel is disabled from unlatching by interrupting power flow to an unlatching actuator of the inner gate panel. Several technologies are described for detecting the object in the hazard space.

One embodiment relates to a method of operating a vehicle having a multi-panel tailgate. The multi-panel tailgate comprises a primary gate panel having a latched state when secured in a closed, vertical position and configured to pivot with respect to the vehicle in an unlatched state between the closed position and an open, horizontal position. The multi-panel tailgate further comprises an inner gate panel having a latched state when secured in a closed position coplanar with the primary gate panel and configured to pivot with respect to the primary gate panel in an unlatched state between the closed position and an open position perpendicular to the plane of the primary gate panel. The vehicle further comprises a tailgate unlatching power circuit configured to selectively supply power to a first unlatching actuator to transition the primary gate panel from its latched to its unlatched state, and further configured to selectively supply power to a second unlatching actuator to transition the inner gate panel from its latched to its unlatched state. An object is detected within a hazard space that the inner gate panel would occupy when the primary gate panel is in the open position and the inner gate panel is in the unlatched state. The state of the primary gate panel is ascertained. In response to detecting the object in the hazard space and the primary gate panel being in its unlatched state, the inner gate panel is disabled from entering its unlatched state and pivoting with respect to the primary gate panel, by inhibiting power flow from the unlatching power circuit to the second unlatching actuator.

Another embodiment relates to a tailgate deactivation system for a vehicle having a multi-panel tailgate. The multi-panel tailgate comprises a primary gate panel having a latched state when secured in a closed, vertical position and configured to pivot with respect to the vehicle in an unlatched state between the closed position and an open, horizontal position. The multi-panel tailgate further comprises an inner gate panel having a latched state when secured in a closed position coplanar with the primary gate panel and configured to pivot with respect to the primary gate panel in an unlatched state between the closed position and an open position perpendicular to the plane of the primary gate panel. The vehicle further comprises a tailgate unlatching power circuit configured to selectively supply power to a first unlatching actuator to transition the primary gate panel from its latched to its unlatched state, and further configured to selectively supply power to a second unlatching actuator to transition the inner gate panel from its latched to its unlatched state. The tailgate deactivation system includes a sensor configured to monitor a hazard space that the inner gate panel would occupy when the primary gate panel is in the open position and the inner gate panel is in the unlatched state. The tailgate deactivation system further includes a controller configured to receive an output of the sensor; in response to the sensor output, detect an object within the hazard space; and ascertain the state of the primary gate panel. In response to detecting the object in the hazard space and the primary gate panel being in its unlatched state, the controller is configured to disable the inner gate panel from entering its unlatched state and pivoting with respect to the primary gate panel, by inhibiting power flow from the unlatching power circuit to the second unlatching actuator.

BRIEF DESCRIPTION OF THE DRAWINGS

The present disclosure will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention Certain vehicles, including pickup trucks, utilize multi-panel tailgates that include a primary gate panel and an inner gate panel, which allow operators to quickly configure the tailgate into any of several different tailgate configurations. In certain configurations, when the primary gate panel is positioned in a substantially horizontal plane (e.g., the tailgate is open), the inner gate panel is capable of pivoting below the horizontal plane to a nearly vertical plane. If a towing apparatus, such as a ball mount system, has been installed on the vehicle, the inner gate panel is capable of impacting the towing apparatus and damaging the inner gate panel.

The embodiments disclosed herein include a tailgate deactivation system that deactivates the inner gate panel of a multi-panel tailgate to inhibit movement of the inner gate panel with respect to the primary gate panel, and thus prevent the inner gate panel from being inadvertently pivoted downward into a towing apparatus that is coupled to the vehicle.

Figure 1:
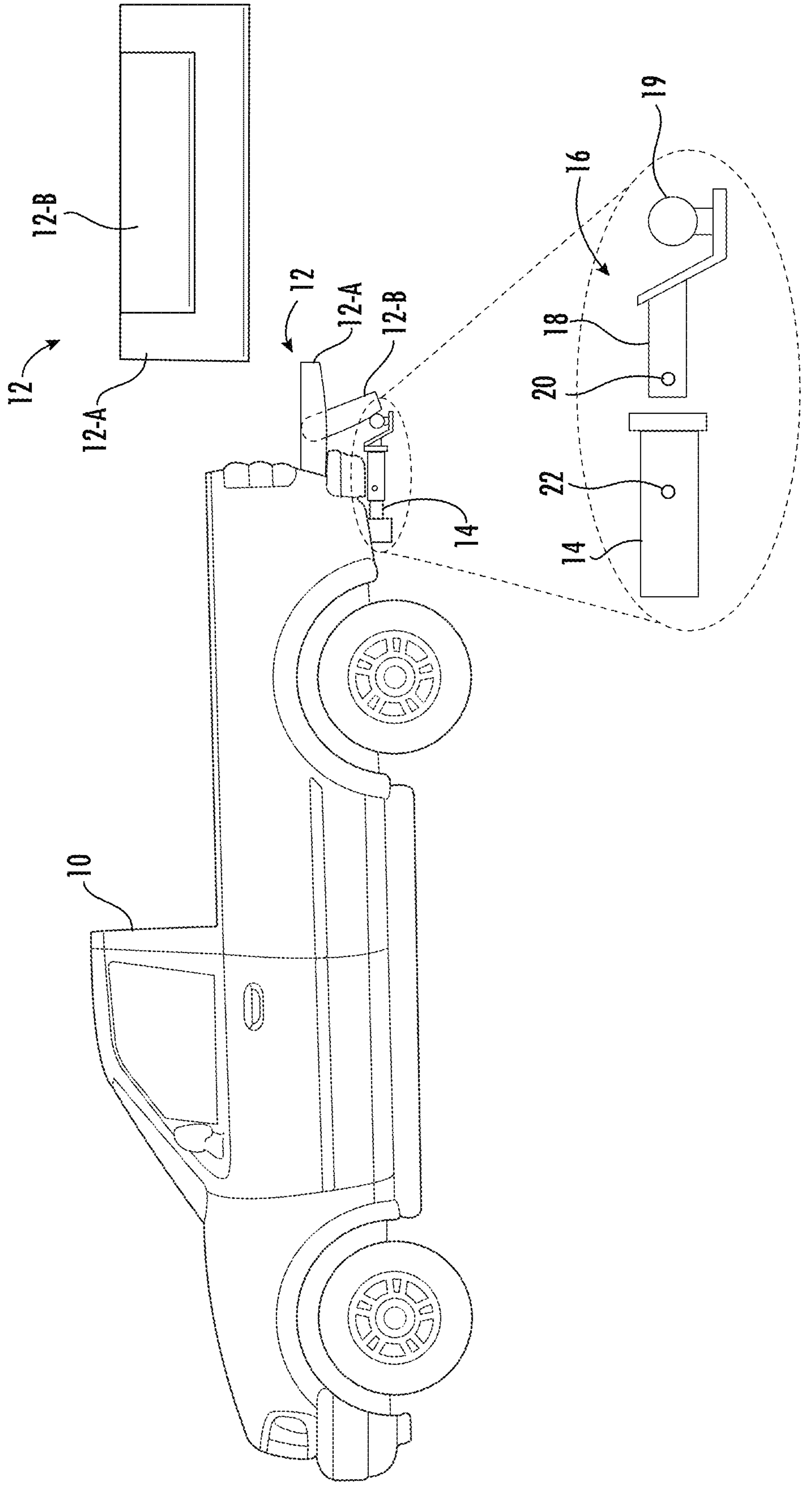
FIG. 1 (PRIOR ART)
FIG. 1 is a schematic block diagram of a vehicle with a multi-panel tailgate.

FIG. 1 is a schematic block diagram of a vehicle 10 with a multi-panel tailgate 12. The multi-panel tailgate 12 includes a primary gate panel 12-A and an inner gate panel 12-B, each of which may open (i.e., pivot) independently of one another. While for purposes of illustration the multi-panel tailgate 12 has only two panels, the embodiments herein apply to multi-panel tailgates that have more than two panels. The vehicle 10 may comprise any vehicle having a multi-panel tailgate in which at least one panel of the multi-panel tailgate, when opened, is capable of pivoting below the bed of the vehicle 10. By way of non-limiting example, the multi-panel tailgate 12 may comprise a GMC® SIERRA® brand pickup truck, such as Models 1500, 2500, and 3500, model years 2019, 2020, or the like, although the embodiments are not limited to any particular vehicle or to any particular multi-panel tailgate.

The vehicle 10 includes a hitch receiver tube 14. A ball mount system 16 is mounted within the hitch receiver tube 14. The ball mount system 16 includes a shaft 18 that has two opposing shaft openings 20 (only one shaft opening 20 seen in FIG. 1), and a trailer hitch ball 19. To couple the ball mount system 16 to the hitch receiver tube 14, the operator inserts the shaft 18 into the hitch receiver tube 14 until the shaft openings 20 align with two hitch pin openings 22 (only one hitch pin opening 22 seen in FIG. 1). A hitch pin (not illustrated) may then be installed into the hitch pin openings 22 and shaft openings 20 to lock the ball mount system 16 with respect to the hitch receiver tube 14. The embodiments disclosed herein prevent the inner gate panel 12-B of the multi-panel tailgate 12 from opening when a towing apparatus, such as the ball mount system 16, is coupled to the hitch receiver tube 14 to prevent the inner gate panel 12-B from impacting the ball mount system 16 and damaging the inner gate panel 12-B.

FIGS. 2 and 5-7 illustrate a tailgate deactivation system 24-1 according to one embodiment, referred to herein as an auto override switch. The auto override switch embodiment of the tailgate deactivation system 24-1 includes a switch 26 coupled to a hitch receiver tube mount 28. The hitch receiver tube mount 28 is configured to fix the switch 26 to the hitch receiver tube 14 of the vehicle 10 (FIG. 1). In this embodiment, the hitch receiver tube mount 28 includes a tab 46 with a through hole 48 that aligns the switch 26 is proper relation to the vehicle hitch receiver tube 14. The hitch receiver tube mount 28 and tab 46 include an adhesive (on the underside thereof) for coupling the hitch receiver tube mount 28 and tab 46 to the hitch receiver tube 14. In other embodiments, the hitch receiver tube mount 28 may comprise a band, an L-shaped bracket, or the like, that partially or completely encircles the hitch receiver tube 14, or may comprise any other mechanism suitable for fixing the switch 26 with respect to the hitch receiver tube 14. The hitch receiver tube mount 28 and tab 46 may comprise any suitably rigid material, such as metal, plastic, or the like.

The switch 26 includes two terminals 32 configured to be electrically coupled to a tailgate power circuit 34 that supplies power to at least a portion of the multi-panel tailgate 12 (FIG. 1). In one embodiment, the tailgate deactivation system 24-1 may include wires 36 coupled to the terminals 32 that terminate in a plug 38 that can be press-connected with a plug 40 of the tailgate power circuit 34. In other embodiments, where the tailgate power circuit 34 does not include a suitable plug, or where a plug is not desired, the wires 36 may be electrically connected to corresponding wires of the tailgate power circuit 34 via any suitable mechanism, such as soldering, twist-on wire connectors, or the like. In some embodiments, where only the inner gate panel 12-B is capable of impacting the ball mount system 16 (FIG. 1), the tailgate power circuit 34 supplies power to the inner gate panel 12-B.

Figure 2:
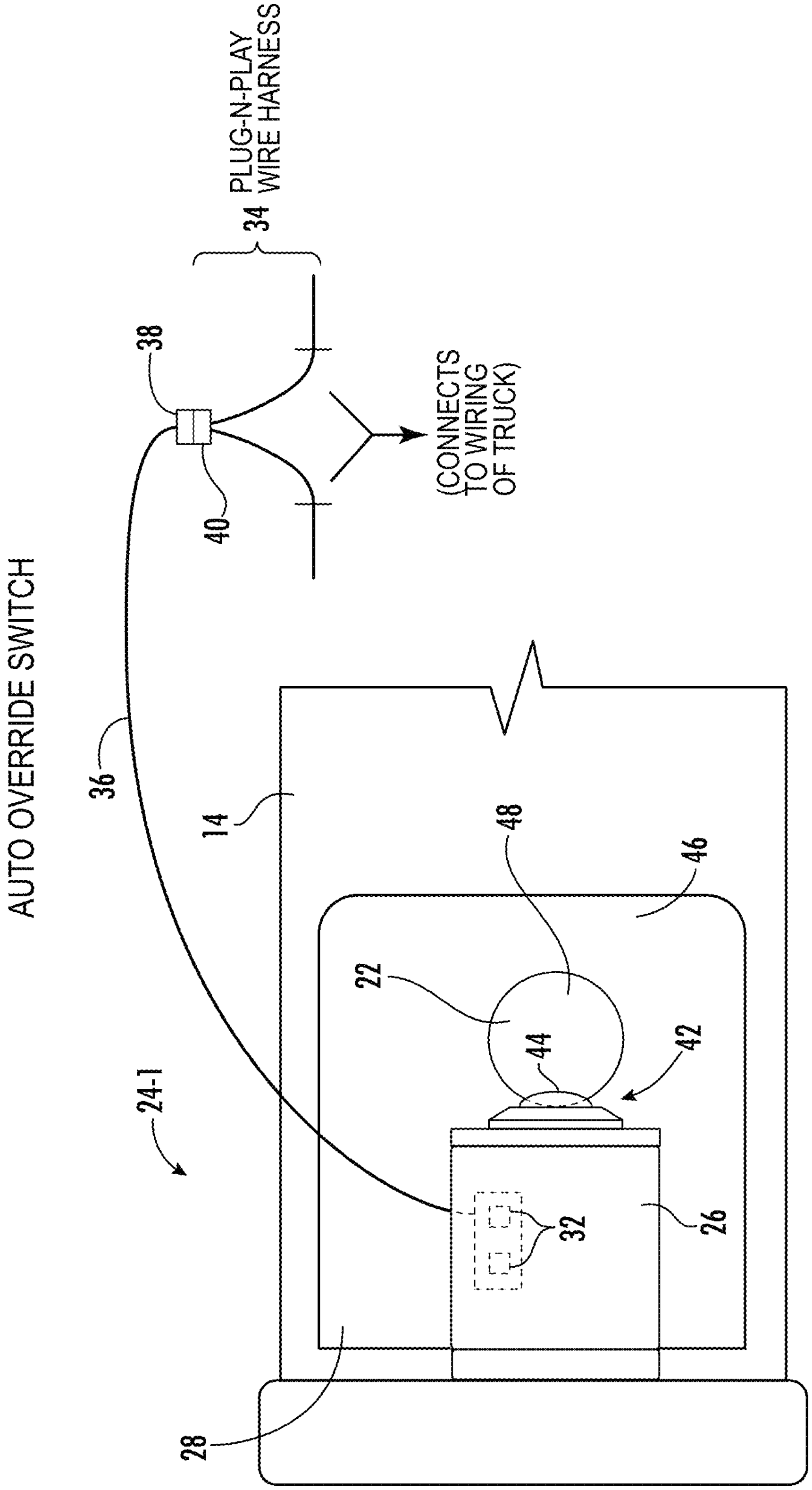
FIG. 2 illustrates a schematic of a tailgate deactivation system according to an auto override switch embodiment.
Figure 3:
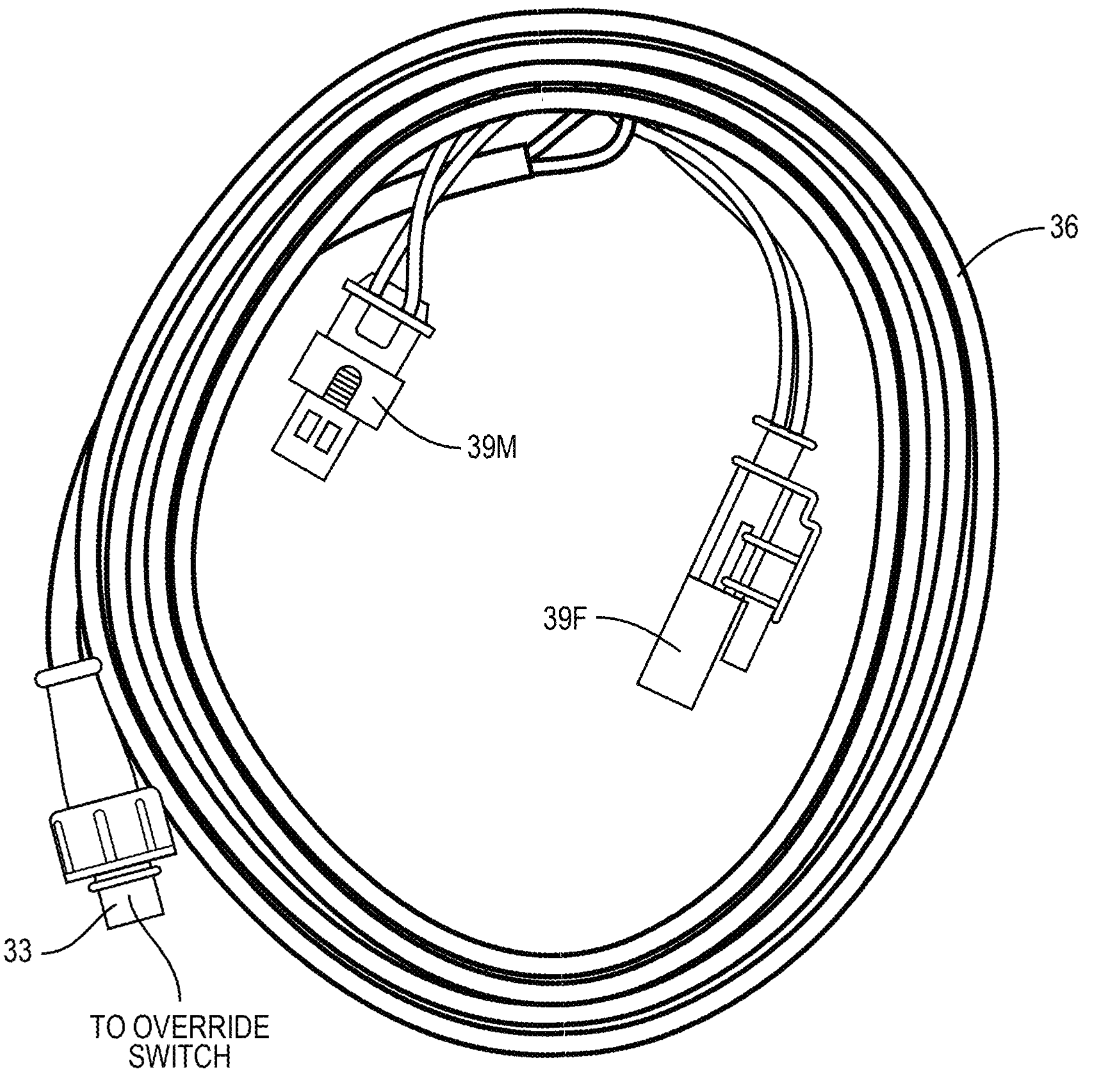
FIG. 3 is a perspective view of one implementation of the cable of FIG. 2.

FIG. 3 depicts one embodiment of a cable assembly that facilitates retrofitting existing vehicles 10 with the tailgate deactivation system 24-1. The cable assembly includes a cable 36, as depicted in FIG. 2. A matched set of connectors, comprising a female connector 39F and male connector 39M, implement the functionality of the plugs 38, 40 depicted in FIG. 2. In particular, some existing vehicles have a male/female connector set in an electrical line that supplies power to an actuator that unlatches the inner gate panel 12-B. The cable assembly of FIG. 3 interrupts that electrical line, and interposes the switch terminals 32 in series between the connectors 39F, 39M. To install the cable 36, a male/female connector pair of the vehicle is disconnected. The vehicle male plug is connected to female connector 38F, which may for example comprise a MOLEX® 34899 2081 MXP120 connector. The vehicle female plug is connected to male connector 38M, which may for example comprise a MOLEX® 34900 2121 MXP120 connector. Note that these connectors 39F, 39M are close together, at one end of the cable 36. At the opposite end of the cable 36, a connector 33 connects to the override switch 32 (FIG. 2). Accordingly, actuation of the override switch 32 interrupts or enables the passage of electrical signals between the male/female connector pair of the vehicle.

The switch 26 includes an actuator 42 configured to electrically couple the two terminals 32 in an on state to allow power to flow in the tailgate power circuit 34, and thereby facilitate movement of the inner gate panel 12-B with respect to the primary gate panel 12-A. In an off state, the actuator 42 decouples the two terminals 32 to inhibit power from flowing in the tailgate power circuit 34 and to inhibit movement of the inner gate panel 12-B with respect to the primary gate panel 12-A.

The actuator 42 comprises an actuation surface 44 that is configured to cause the switch 26 to transition from the on state to the off state by the coupling of the ball mount system 16 to the hitch receiver tube 14. Thus, an operator needs only perform their normal process for coupling the ball mount system 16 to the hitch receiver tube 14 to transition the switch 26 to the off state, and thereby disable the ability for the inner gate panel 12-B to pivot below the primary gate panel 12-A and accidentally contact the ball mount system 16.

The actuation surface 44, in this embodiment, is configured to transition the switch 26 from the on state to the off state in response to a hitch pin (sometimes referred to as a lock pin) being inserted through the hitch pin openings 22 of the hitch receiver tube 14 as the ball mount system 16 is coupled to the hitch receiver tube 14. As illustrated, the hitch receiver tube mount 28 is positioned on the hitch receiver tube 14 to couple the actuation surface 44 with respect to the hitch pin opening 22, such that installation of a hitch pin during the process of coupling the ball mount system 16 to the hitch receiver tube 14 causes the switch 26 to be placed in the off state.

In this auto override switch embodiment, the actuation surface 44 is placed in a path of a shaft portion of a hitch pin, so that installation of the hitch pin causes the shaft portion of the hitch pin to contact the actuation surface 44. As described above, the tailgate deactivation system 24-1 includes a tab 46 that includes a through hole 48, which can be positioned during installation to be co-linear with one of the hitch pin openings 22 of the hitch receiver tube 14, to facilitate positioning the actuation surface 44 and the hitch receiver tube mount 28 at a proper location with respect to the hitch pin opening 22. It will be apparent that the actuation surface 44 could be located at other locations on the hitch receiver tube 14 to cause the switch 26 to be activated during the coupling of the ball mount system 16 to the hitch receiver tube 14. It will also be apparent that the actuation surface 44 could be activated by the installation of a hitch pin even if not located to be co-linear with the hitch pin openings 22, depending on the shape and configuration of the hitch pin. For example, the actuation surface 44 may be placed at a location to be contacted by a stop collar of a hitch pin, or placed at a location where a hitch pin accessory, such as a hitch pin lock, makes contact with the actuation surface 44. It will also be appreciated that the switch 26 may comprise any suitable type of switch, such as a proximity switch or the like, that can be activated by the coupling of the ball mount system 16 to the hitch receiver tube 14.

Figure 4A:
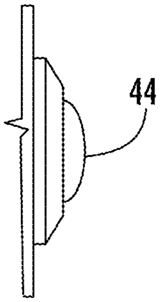
FIGS. 4A-4C illustrate various example actuation surfaces according to different embodiments.
Figure 4B:
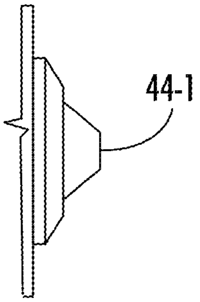
Figure 4C:
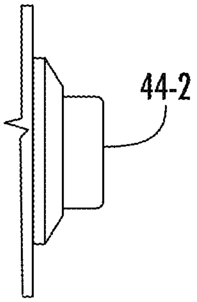

FIGS. 4A-4C illustrate various example actuation surfaces 44, 44-1, 44-2 that may be suitable for actuating the switch 26 during installation of a hitch pin, according to different embodiments.

Figure 5:
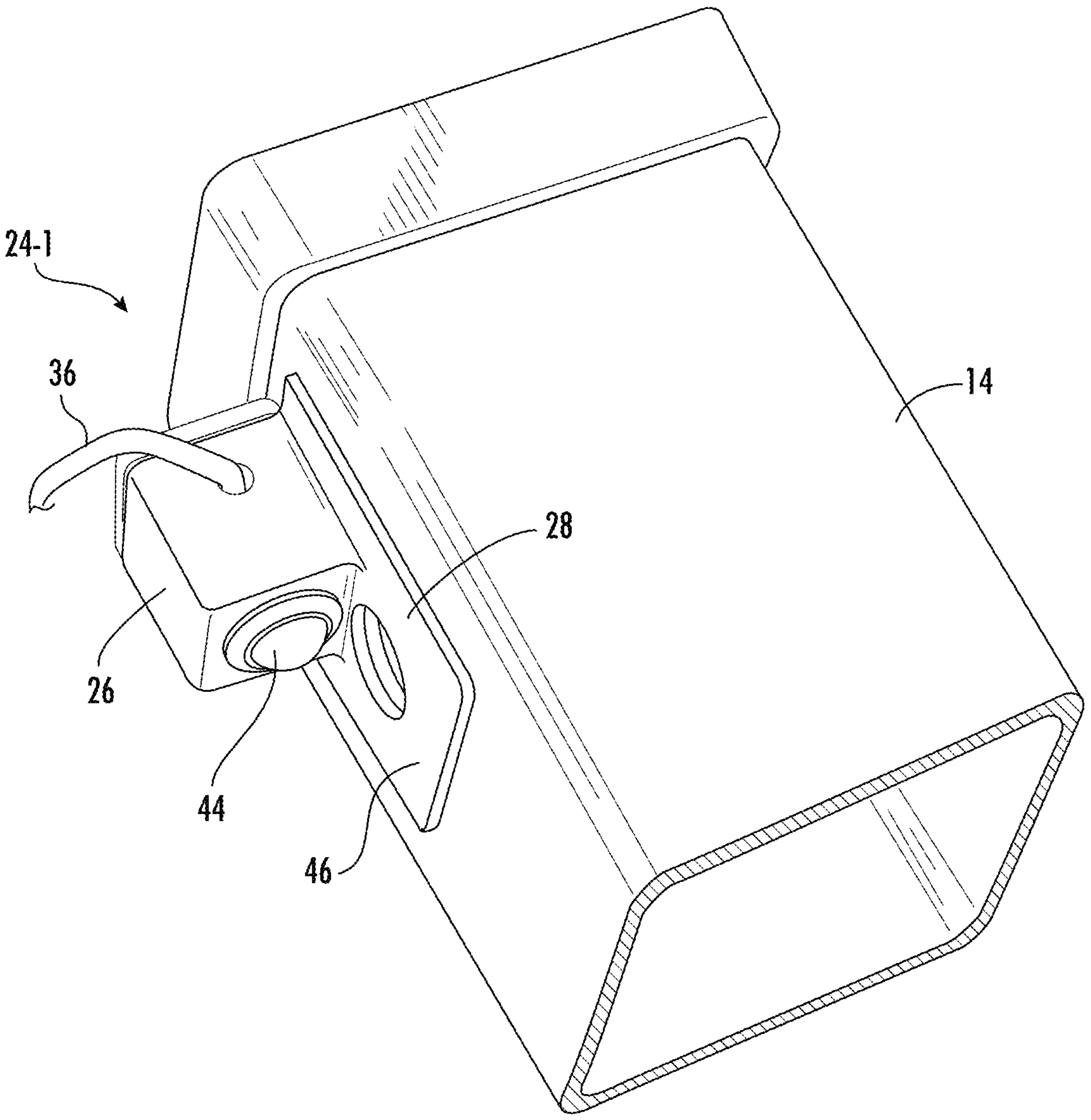
FIG. 5 is a perspective view of the tailgate deactivation system illustrated in FIG. 2.

FIG. 5 is a perspective view of the tailgate deactivation system 24-1 coupled to the hitch receiver tube 14 according to one embodiment.

Figure 6:
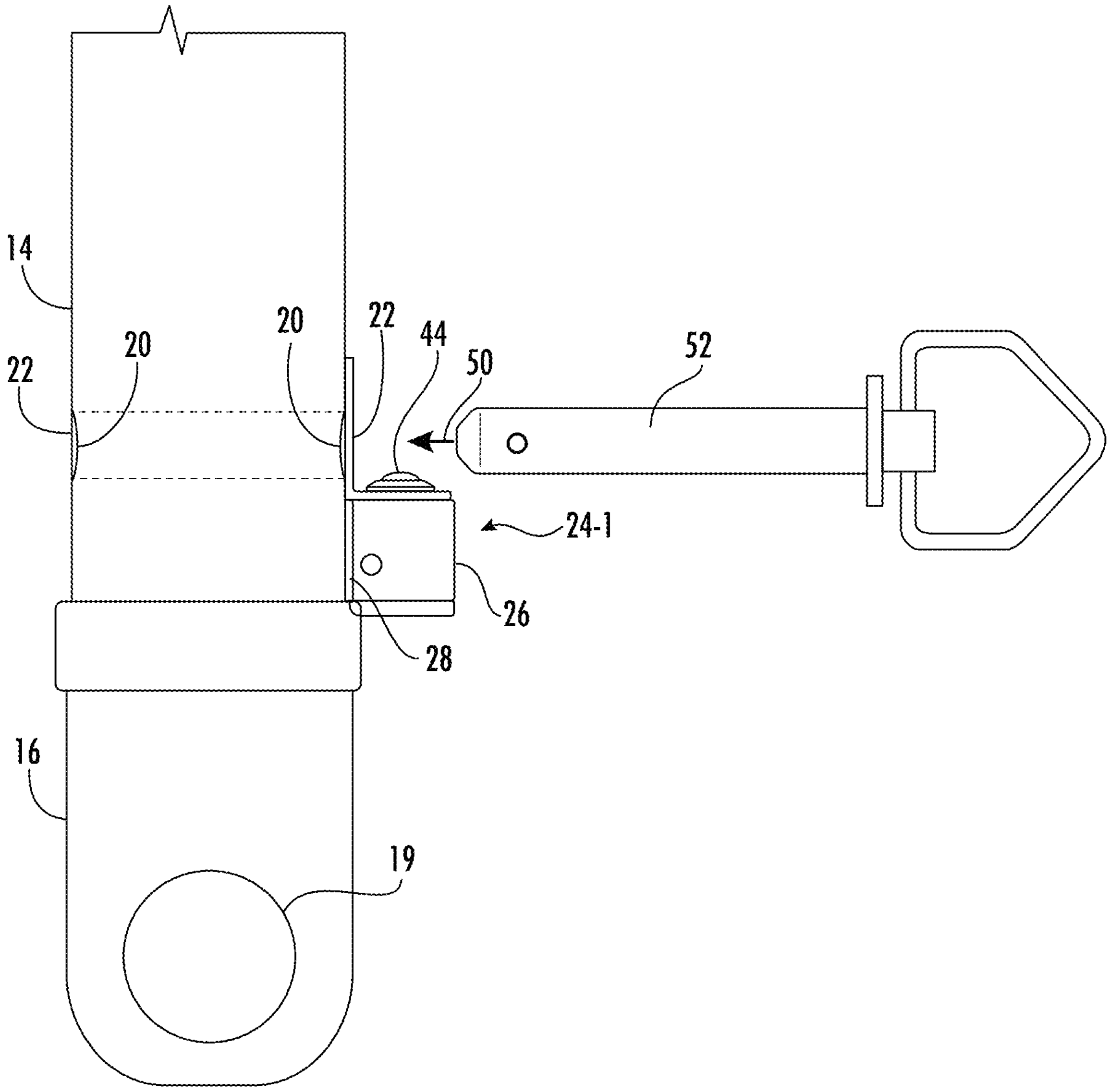
FIG. 6 illustrates a schematic of a hitch pin installation according to the auto override switch embodiment.

FIG. 6 is a schematic illustrating a hitch pin installation according to the auto override switch embodiment. In this embodiment, the tailgate deactivation system 24-1 is configured such that the actuation surface 44 is placed in a path 50 of a hitch pin 52 during installation of the hitch pin 52 in the hitch pin openings 22 of the hitch receiver tube 14 and the shaft openings 20 of the shaft 18 of the ball mount system 16. As the hitch pin 52 is installed, a portion of the hitch pin 52, in this example a shaft portion of the hitch pin 52, contacts the actuation surface 44 and thereby causes the switch 26 to be placed into the off state, thereby inhibiting power from flowing to the tailgate power circuit 34 of the multi-panel tailgate 12. It will be apparent that, in this embodiment, the hitch pin 52 may also be inserted into the hitch pin openings 22 from the opposite direction of that shown in FIG. 5 to thereby contact the actuation surface 44.

Figure 7:
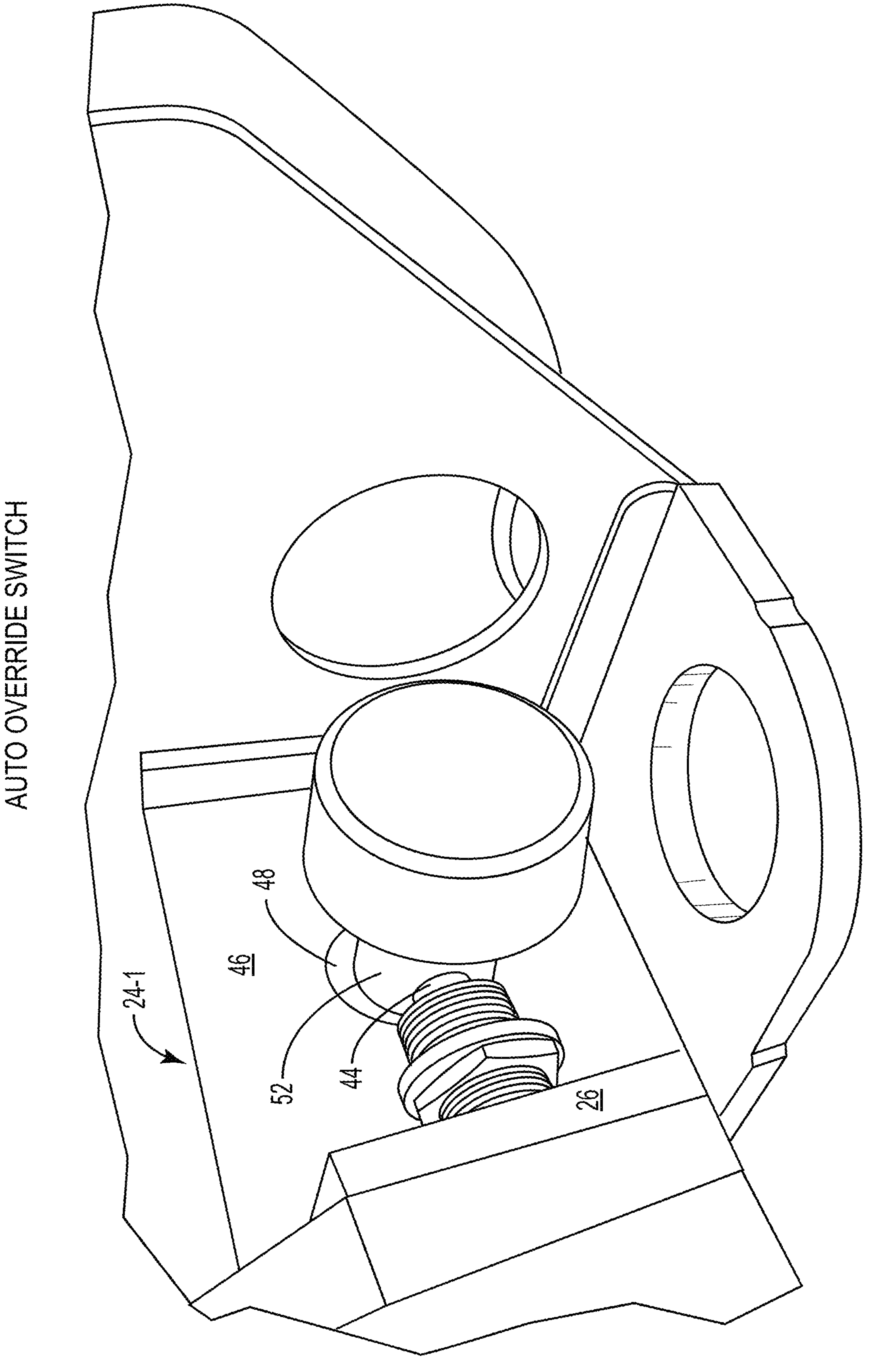
FIG. 7 is another perspective view of the tailgate deactivation system illustrated in FIG. 2.

FIG. 7 is a perspective view, rendered from a photograph, of the tailgate deactivation system 24-1 coupled to the hitch receiver tube 14 of a pickup truck, according to the auto override switch embodiment. FIG. 7 shows a hitch pin 52 depressing the actuation surface 44 of the actuator 42. In this position, the actuator 42 decouples the switch terminals 32 (FIG. 2) to inhibit power from flowing in the tailgate power circuit 34 (FIG. 2) and to inhibit movement of the inner gate panel 12-B with respect to the primary gate panel 12-A (FIG. 1).

Figure 8:
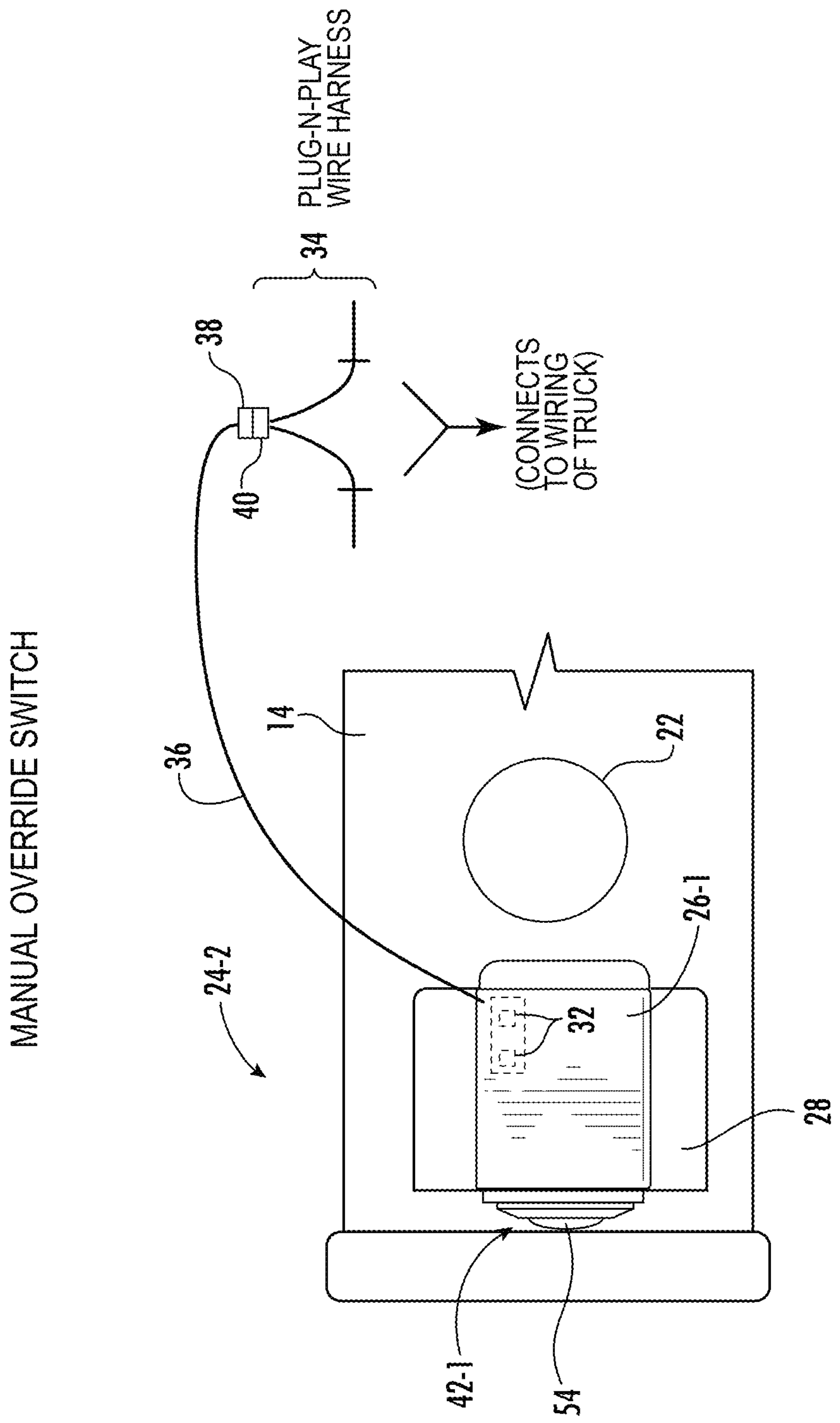
FIG. 8 illustrates a schematic of a tailgate deactivation system according to a manual override switch embodiment.

FIG. 8 illustrates a schematic of a tailgate deactivation system 24-2 according to a manual override switch embodiment. The tailgate deactivation system 24-2 is substantially similar to the tailgate deactivation system 24-1, except as otherwise discussed herein. The tailgate deactivation system 24-2 includes the hitch receiver tube mount 28 which is configured to fix a switch 26-1 to the hitch receiver tube 14 of the vehicle 10 (FIG. 1). The hitch receiver tube mount 28 includes an adhesive (on the underside thereof) for coupling the hitch receiver tube mount 28 to the hitch receiver tube 14. Of course, the hitch receiver tube mount 28 could be mounted in any location on the vehicle 10; however, mounting the hitch receiver tube mount 28 on the hitch receiver 14 associates it with the towing apparatus installation operation, minimizing the chance that an operator may forget to actuate the switch 26-1. In other embodiments, the hitch receiver tube mount 28 may comprise an L-shaped bracket that partially encircles the hitch receiver tube 14, a band that completely encircles the hitch receiver tube 14, or any other mechanism suitable to fixing the switch 26-1 with respect to the hitch receiver tube 14, such as simply an adhesive strip, or the like.

The switch 26-1 includes the two terminals 32 configured to be electrically coupled to the tailgate power circuit 34 that supplies power to at least a portion of the multi-panel tailgate 12 (FIG. 1). The tailgate deactivation system 24-2 may include the wires 36 coupled to the terminals 32 that terminate in the plug 38 that can be press-connected with the plug 40 of the tailgate power circuit 34. In some embodiments, the cable assembly of FIG. 3 may be used to interpose the switch terminals 32 in the vehicle electrical line. In other embodiments, where the tailgate power circuit 34 does not include a suitable plug, the wires 36 may be electrically connected to corresponding wires of the tailgate power circuit 34 via any suitable mechanism, such as soldering, twist-on wire connectors, or the like. In some embodiments, where only the inner gate panel 12-B is capable of impacting the ball mount system 16 (FIG. 1), the tailgate power circuit 34 supplies power to the inner gate panel 12-B.

The switch 26-1 includes an actuator 42-1 configured to, in an on state, electrically couple the two terminals 32 to allow power to flow in the tailgate power circuit 34, and thereby facilitate movement of the inner gate panel 12-B with respect to the primary gate panel 12-A. In an off state, the actuator 42-1 decouples the two terminals 32 to inhibit power from flowing in the tailgate power circuit 34, and thereby inhibit movement of the inner gate panel 12-B with respect to the primary gate panel 12-A. In this manual override switch embodiment, the actuator 42-1 is configured to be actuated by the exertion of physical force by an operator or other individual against the actuator 42-1 to manually depress the actuator 42-1. In this example, the actuator 42-1 includes an actuation surface in the form of a manual push-button 54, and the operator urges the manual push-button 54 to cause the switch 26-1 to be in the on state to allow power to flow in the tailgate power circuit 34. Pressing the manual push-button 54 a second time causes the switch 26-1 to be in the off state to inhibit power from flowing in the tailgate power circuit 34. Note that the push-button 54 is positioned to face in a direction behind the vehicle.

Although FIG. 7 depicts the switch 26-1 as a separate physical switch, the functionality of the switch 26-1 may be implemented in various ways. For example, a proximity sensing function may be used to override the normal functionality of an existing switch, such as an inner gate panel 12-B unlatching switch. In some embodiments, to ensure a separation between the switch's unlatching and override functions, a duration requirement (e.g., implemented as the expiry of a timer) may be added to the proximity sensing prior to changing the functionality of the switch.

Figure 9:
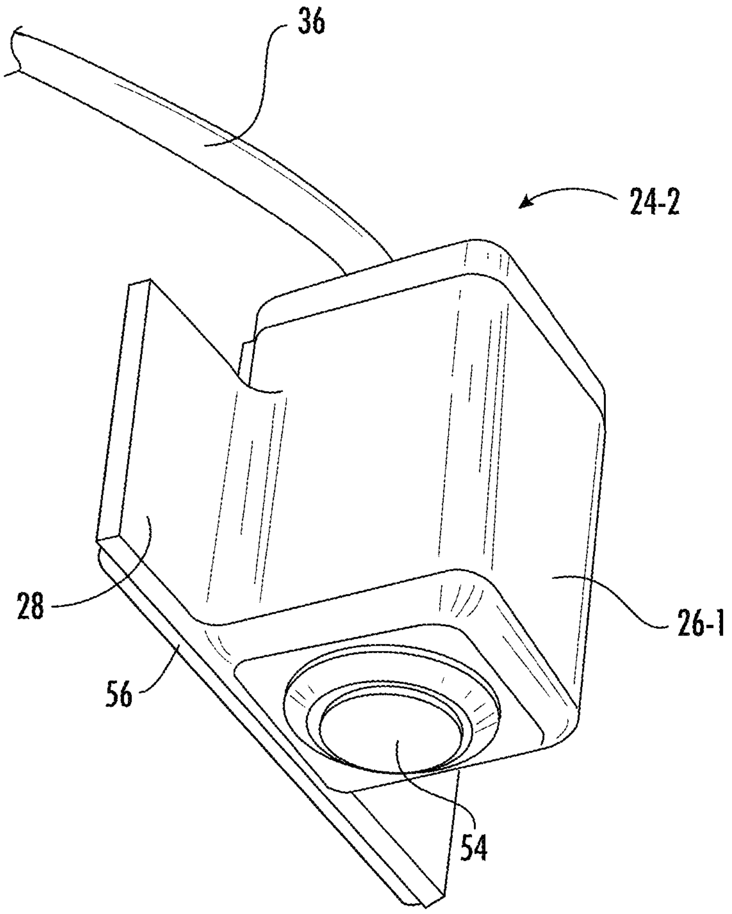
FIG. 9 is a perspective view of the tailgate deactivation system illustrated in FIG. 8.

FIG. 9 is a perspective view of the tailgate deactivation system 24-2 illustrated in FIG. 8. The tailgate deactivation system 24-2 may include an adhesive strip 56 coupled to the underside of the hitch receiver tube mount 28 to facilitate attachment of the hitch receiver tube mount 28 to the hitch receiver tube 14.

Figure 10:
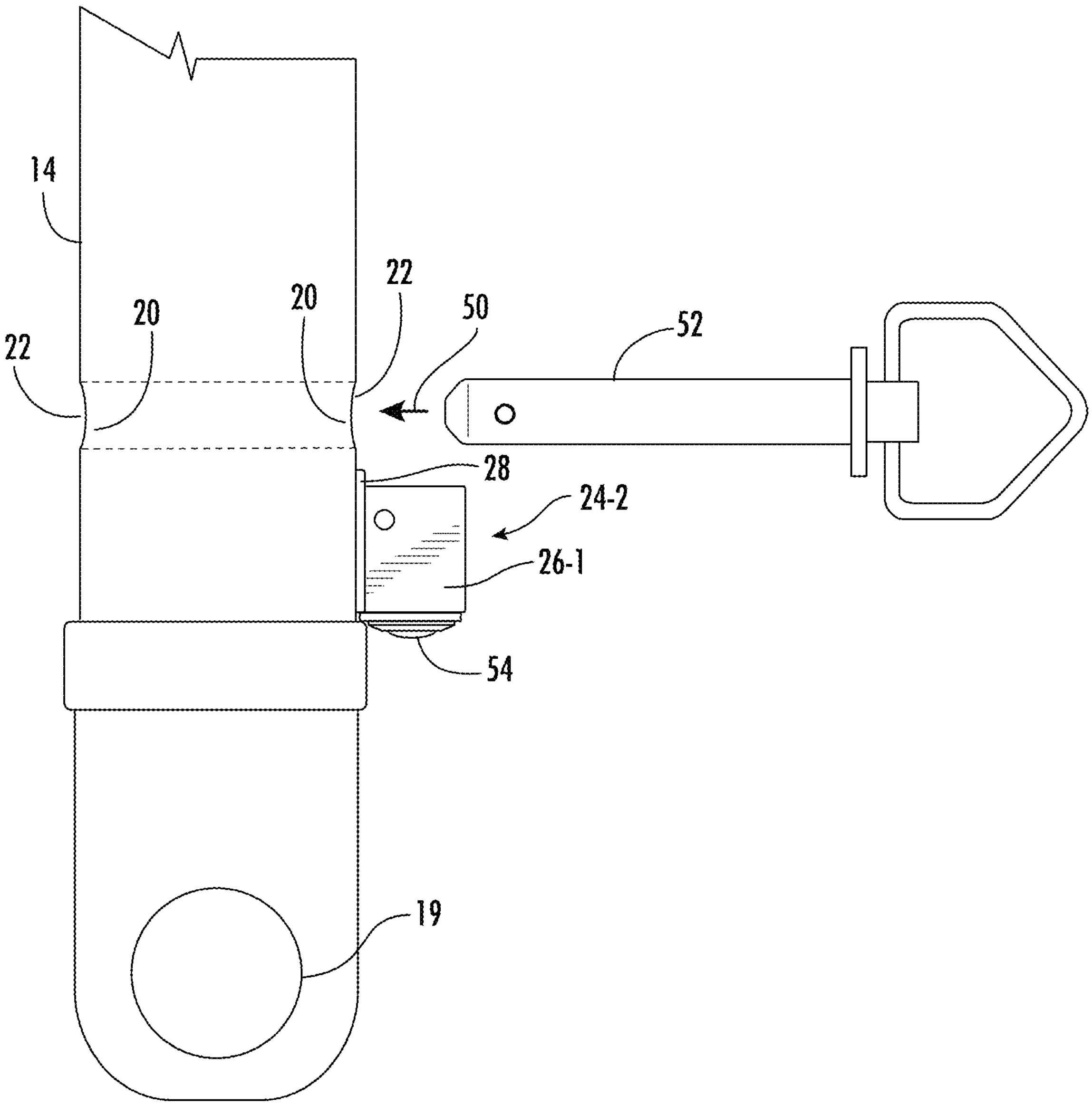
FIG. 10 illustrates a schematic showing the hitch pin in the manual override switch embodiment of the tailgate deactivation system.

FIG. 10 illustrates a schematic of a hitch pin installation according to the manual override switch embodiment. In this embodiment, the tailgate deactivation system 24-2 is configured such that the push-button 54 faces a direction behind the vehicle to facilitate easy actuation by an operator.

Figure 11:
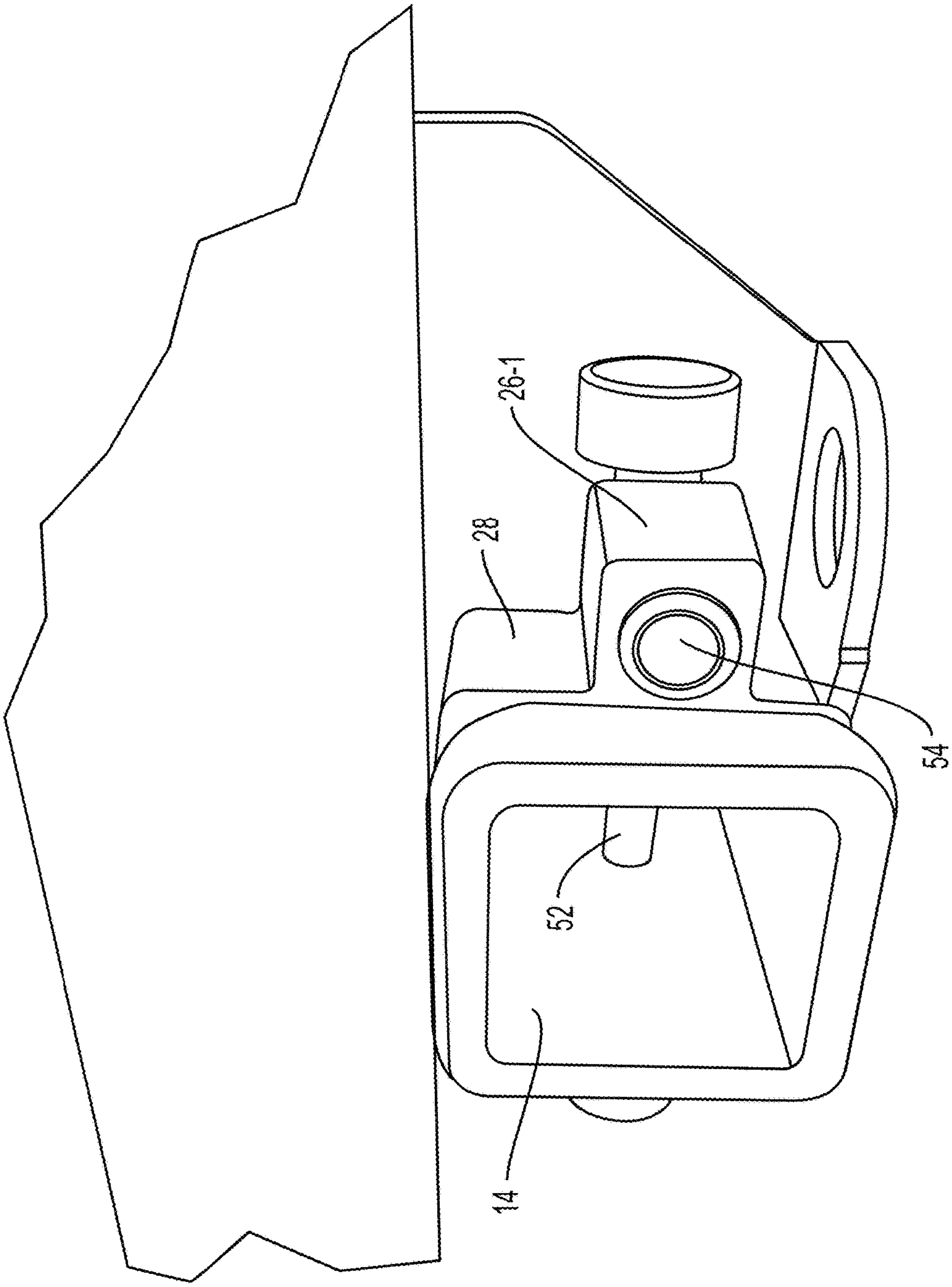
FIG. 11 is another perspective view of the tailgate deactivation illustrated in FIG. 8.

FIG. 11 is a perspective view, rendered from a photograph, of the manual override switch embodiment of the tailgate deactivation system 24-2 coupled to the hitch receiver tube 14 of a pickup truck, according to the embodiment of FIG. 8. FIG. 11 shows the switch 26-1 mounted to the hitch receiver tube 14 with the manual push-button 54 facing the rear of the vehicle, where it is readily accessible by an operator installing a ball mount system 16 into the hitch receiver tube 14. FIG. 11 does not show the ball mount system 16 installed, for clarity. However, FIG. 11 does show the hitch pin 52 installed in the hitch pin openings 22 in the receiver tube 14, to show that in this embodiment, the placement of the switch 26-1 is independent of the location of the hitch pin 52.

As discussed above, and with reference to FIG. 1, multi-panel tailgates 12, such as those installed on some pickup trucks 10, have two panels: a primary panel 12-A and an inner panel 12-B. The primary panel 12-A pivots, with respect to the vehicle 10, between closed (vertical) and open (horizontal) positions. The inner panel 12-B pivots, with respect to the primary panel 12-A, between closed (coplanar with the primary panel 12-A) and open (perpendicular to the primary panel 12-A) positions. The closed and open positions of the two panels are independent. Although FIG. 1 depicts a common configuration, with a "U" shaped primary gate panel 12-A and an inner gate panel 12-B (when closed) surrounded on three sides by the primary gate panel 12-A, aspects of the present disclosure apply other configurations of multi-panel tailgates 12. For example, the "inner" gate panel 12-B, which pivots with respect to the primary gate panel 12-A, may run along the entire width of the multi-panel tailgate 12. As used herein, the term "inner" when describing the tailgate panel 12-B is a term of reference, used to distinguish the inner gate panel 12-B from the primary gate panel 12-A, even in configurations where the inner gate panel 12-B is not "within" the primary gate panel 12-A, as depicted in FIG. 1. A multi-panel tailgate 12 is thus usually described by four gate panel positions, as summarized in Table 1 below.

TABLE 1

| Primary | Inner | Notes |
|---|---|---|
| Closed | Closed | Normal driving condition |
| Open | Closed | Mimics conventional, single-panel tailgate |
| Closed | Open | Quick Access to truck bed; aggregate, etc. retained in bed |
| Open | Open | See FIG. 1: hazard of contact with object, such as towing assembly, in a hazard space through which the inner panel moves when the primary panel is in the open position. |

Although the panels of a multi-panel tailgate 12 are normally discussed in terms of their closed or open positions, based on the way the tailgate panels 12-A,B are controlled, it is more precise in some contexts to refer to them as each having two states: latched and unlatched. Each tailgate panel 12-A,B is latched in its respective closed position, and a mechanical (or electromechanical) latch actuates in response to the tailgate panel 12-A,B being manually moved to the closed position. Each tailgate panel 12-A,B may be unlatched manually, and additionally, in some vehicles, by a remote button, such as on the dashboard. An unlatching actuator, such as a solenoid, operates to unlatch the tailgate panel 12-A,B, after which it may be moved towards the open position, or may fall towards the open position by operation of gravity. The primary gate panel 12-A and inner gate panel 12-B have separate and (mostly) independent unlatching actuators. Both unlatching actuators are independently powered by a tailgate unlatching power circuit, which may be part of the vehicle electrical system (e.g., Controller Area Network, or CAN, or a proprietary control system, such as the Chevrolet K9 Body Control Module, or BCM). In the latched state, each of the primary and inner gate panels 12-A,B has only one position, defined as its closed position, and it does not pivot.

In the unlatched state, the primary gate panel 12-A is free to pivot with respect to the vehicle 10 (e.g., the truck bed) between its closed and opened positions. In the unlatched state, the inner gate panel 12-B is free to pivot with respect to the primary gate panel 12-A between its closed and opened positions. Note that for each tailgate panel 12-A,B, the unlatched state includes not only the open position, but also all intermediate positions between the fully closed position and the open position. In the latched state, each tailgate panel 12-A,B is necessarily in its closed position. In the unlatched state, each tailgate panel 12-A,B may assume any position other than its closed position (with the exception that immediately upon unlatching, a tailgate panel 12-A,B may remain in the closed position and must be manually started towards its open position).

The latched and unlatched states of the primary and inner gate panels are generally independent. However, some manufacturers impose the limitation that, if the primary panel 12-A is in its latched state (and hence closed position) and the inner gate panel 12-B is in its unlatched state (e.g., in the open position), the inner gate panel 12-B must be closed and latched prior to the primary gate panel 12-A unlatching. Presumably, this is to prevent both the primary and inner gate panels 12-A,B from pivoting at the same time. However, operators effectively defeat this limitation by pressing the "unlatch" buttons for the primary and inner gate panels 12-A,B in rapid succession. These buttons may, for example, be located on the tailgate 12 itself (e.g., facing the rear of the vehicle), or may be on a key fob remote control, in the dashboard, etc.

As discussed herein and as illustrated in FIG. 1, a hazard unique to multi-panel tailgates 12 on vehicles 10 such as pickup trucks is the potential for collision of the inner gate panel 12-B with an object, such as a towing apparatus 16, that occupies part of a hazard space that the inner gate panel 12-B would occupy when the primary panel 12-A is in the open position and the inner gate panel 12-B is in the unlatched state. The most common hazard for collision is with a towing apparatus 16 within this hazard space, but in general any object in the hazard space may present a hazard of collision. The hazard space is described herein with reference to the open position of the primary gate panel 12-A and the unlatched state of the inner panel 12-B. It thus includes all positions the inner gate panel 12-B may occupy in a transition from its closed to its open position (with the primary gate panel 12-A in the opened position). Those of skill in the art will readily recognize that in an implementation, a controller may reference the latched or unlatched state of the primary gate panel 12-A, using the unlatched state as a proxy for the primary gate panel 12-A being in the open position. In this case, the actual "hazard space" protected includes not only the space through which the inner gate panel 12-B moves when the primary gate panel 12-A is in the open position, but additionally any space the inner gate panel 12-B may occupy as the primary gate panel 12-A is pivoting from its closed position towards its open position.

The auto override switch and manual override switch embodiments described above, both specifically targeting the towing apparatus 16 collision hazard, interrupt power to the inner gate panel 12-B unlatching actuator in response to the state of an override switch that is either automatically actuated by the insertion of a hitch pin 52 into a hitch receiver 14, or is manually actuated when a towing apparatus 16 is inserted into the hitch receiver 14. Further embodiments of the present disclosure describe additional methods of protecting the inner gate panel 12-B from the hazard of such contact, or contact with any other object in the defined hazard space.

FIG. 11 is a flow diagram depicting the steps in a method 100 of operating a vehicle 10 having a multi-panel tailgate 12. The multi-panel tailgate 12 comprises a primary gate panel 12-A having a latched state when secured in a closed, vertical position and configured to pivot with respect to the vehicle 10 in an unlatched state between the closed position and an open, horizontal position. The multi-panel tailgate 12 further comprises an inner gate panel 12-B having a latched state when secured in a closed position coplanar with the primary gate panel 12-A and configured to pivot with respect to the primary gate panel 12-A in an unlatched state between the closed position and an open position perpendicular to the plane of the primary gate panel 12-A. The vehicle 10 further comprises an unlatching power circuit configured to selectively supply power to a first unlatching actuator to transition the primary gate panel 12-A from its latched to its unlatched state, and further configured to selectively supply power to a second unlatching actuator to transition the inner gate panel 12-B from its latched to its unlatched state.

The hazard space is monitored (block 102). In some embodiments, the hazard space is monitored by a controller (e.g., the controller 64 described below) at all times when the controller is in an active or awake state. In other embodiments, the hazard space is monitored only when such monitoring is enabled. In other words, in some embodiments the methods may optionally include enabling the controller to monitor the hazard space. In yet other embodiments, the hazard space may be monitored only under certain conditions (e.g., when the primary gate panel 12-A is in an unlatched state). In this manner, the method 100 (and systems) can provide flexibility to selectively limit monitoring. It is determined whether an object is within the hazard space that the inner gate panel 12-B would occupy when the primary gate panel 12-A is in the open position and the inner gate panel 12-B is in the unlatched state (block 104). That is, the method includes determining whether an object is within the hazard space through which the inner gate panel 12-B moves when it is unlatched and the primary gate panel 12-A is open. If no such object is detected (block 104), the inner gate panel 12-B is enabled to enter its unlatched state, and pivot with respect to the primary gate panel 12-A, by allowing power flow from the unlatching power circuit to the second unlatching actuator (block 106).

If an object is detected within the hazard space (block 104), the state of the primary gate panel 12-A is considered. If the primary gate panel 12-A is in its latched state (block 108), the inner gate panel 12-B is enabled to enter its unlatched state (block 106). In this manner, if the primary gate panel 12-A is closed, normal operation of the inner gate panel 12-B is not inhibited. Thus, even if a hitch is coupled to the vehicle's hitch receiver, the inner gate panel 12-B can be moved between its closed and open positions.

In response to an object being detected in the hazard space (block 104) and the primary gate panel 12-A being in its unlatched state (block 108), the inner gate panel 12-B is disabled from entering its unlatched state and pivoting with respect to the primary gate panel 12-A, by inhibiting power flow from the unlatching power circuit to the second unlatching actuator (block 110). Note that, although the hazard space is defined in terms of the motion of the inner gate panel 12-B when the primary gate panel 12-A is in its open position, what is actually monitored in the method 100 is the latched/unlatched state of the primary gate panel 12-A. In this case, the primary gate panel 12-A being in its unlatched state is an over-inclusive proxy for the primary gate panel 12-A being in its open position (it could additionally be in any position between the closed and open positions). In other embodiments, a sensor(s) may detect the actual position of the primary gate panel 12-A. In such embodiments, block 104 would ascertain whether the primary gate panel 12-A is in its open position, rather than (or in addition to) its latched/unlatched state.

As indicated by the arrow returning to block 102 from both blocks 106 and 110, the method 100 is ongoing and continuous. An object, such as a towing apparatus 16, may be placed into and/or removed from the hazard space, and the method 100 will appropriately and automatically disable or enable the inner gate panel 12-B from unlatching, in response to the current presence or absence of the object, respectively, and the open position of the primary panel 12-A.

Note that the method 100 imposes no restriction on transitions of the state of the primary gate panel 12-A. That is, regardless of whether an object is detected in the hazard space (block 104), the primary gate panel 12-A, if in its latched state, it is free to unlatch. Of course, the converse is also true (transitions from the unlatched to latched state are the result of manual shutting of the primary gate panel 12-A, which may occur at any time). Accordingly, if an object is detected in the hazard space—such as if a towing apparatus 16 is attached to the vehicle 10—the primary gate panel 12-A may be opened as desired. Once the primary gate panel 12-A unlatches, the method 100 prevents the inner gate panel 12-B from unlatching. Hence, the multi-panel tailgate 12 functions as a conventional, single-panel tailgate so long as the object is detected in the hazard space. The method 100 also allows the multi-panel tailgate 12 to retain a portion of the functionality of the inner gate panel 12-B even when an object is detected in the hazard space. Specifically, the inner gate panel 12-B can be moved between its latched and unlatched states when the primary gate panel 12-A is in its latched state.

Figure 12:
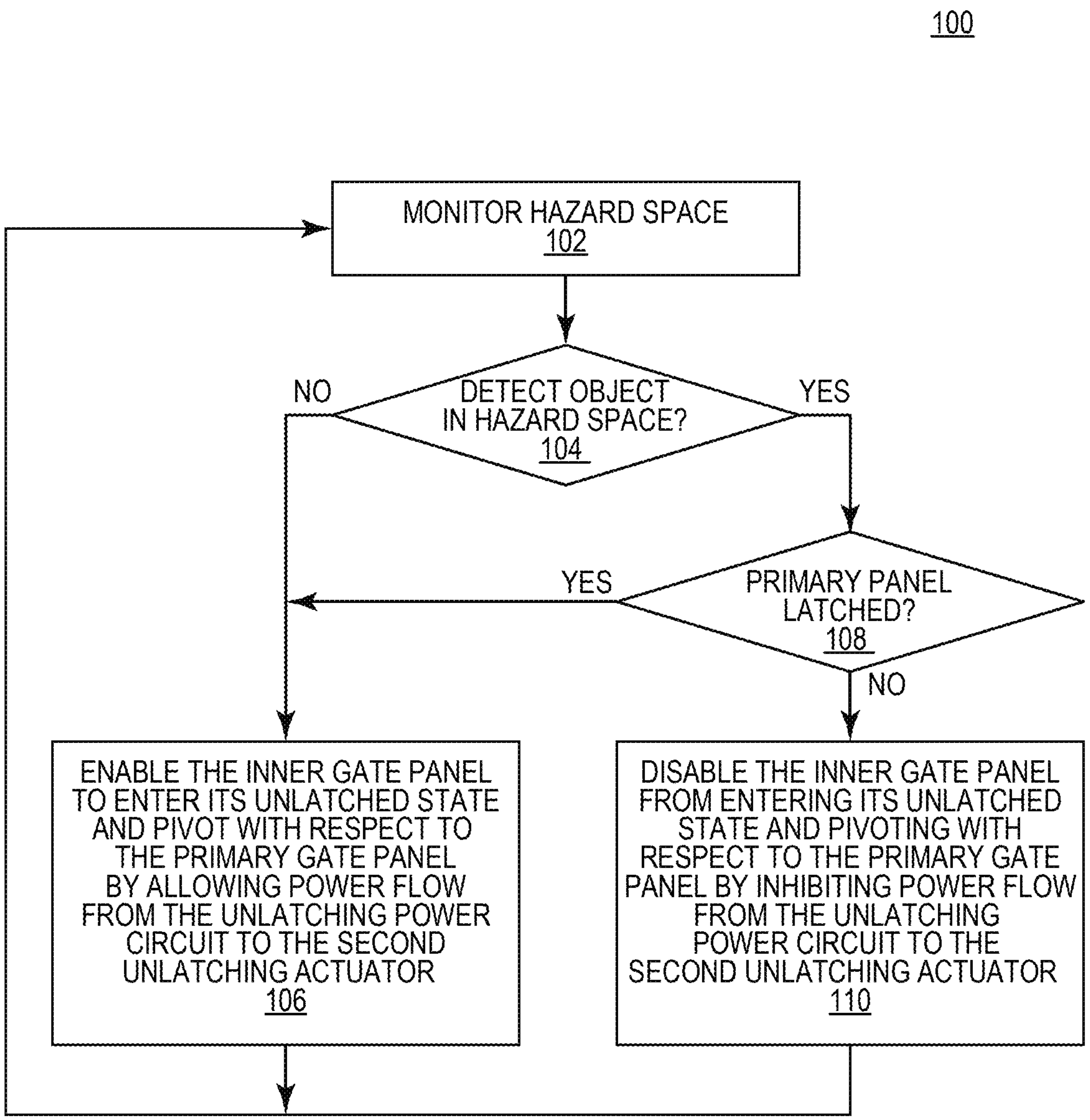
FIG. 12 is a flow diagram of a method of operating a vehicle having a multi-panel tailgate.

FIG. 12 is a functional block diagram depicting one embodiment of a tailgate deactivation system 60, in which a spatial sensor 62 monitors the hazard space (block 104 in FIG. 11). The spatial sensor 62 may, in various embodiments and without limitation, comprise an infrared or visible light camera, a video camera, a RADAR or LIDAR sensor, or an ultrasonic sensor. The spatial sensor 62 may comprise a system of two or more individual sensors, which may be spaced apart on the vehicle 10.

The spatial sensor 62 outputs sensor data to a controller 64, which is operatively connected to memory 66. The controller 64 is configured to detect an object within the hazard space, based on analysis of the output of the spatial sensor 62. In one embodiment, the controller 64 initially receives output from the spatial sensor 62 when no object is present in the hazard space. This sensor output is analyzed and is stored in memory 66 as a reference spatial sensor output. In some embodiments, the reference spatial sensor output can be a calibration setting that is stored in memory 66 during production. In other embodiments, the reference spatial sensor output can be updated periodically (e.g., in response to a hard power shutoff, changing the spatial sensor 62 or the like).

During operation, the controller 64 continuously or periodically receives output from the spatial sensor 62. In some embodiments, the system 60 can operate at all times when the controller 64 is in an active (or awake) state. Conversely, in such embodiments, the system 60 does not operate when the controller 64 is in a sleep state. In some embodiments, the system 60 only operates when enabled. That is, in some embodiments, the system 60 can be disabled. The controller 64 analyzes the spatial sensor output, and compares it to the reference spatial sensor output. If the current spatial sensor output differs from the reference spatial sensor output in a predetermined manner and/or by a predetermined amount, the controller 64 detects that an object is present in the hazard space. The spatial sensor output and reference spatial sensor output may comprise the actual output of the spatial sensor 62, or may comprise a processed representation of the sensor output. In embodiments where the spatial sensor 62 comprises two or more sensors, the controller 64 may process the spatial sensor output and reference spatial sensor output to obtain stereoscopic views, or otherwise process the sensor output to facilitate monitoring of a three-dimensional space. In one embodiment, the controller 64 includes a Machine Learning (ML) model, and the reference spatial sensor output is incorporated into the ML model via training on a large plurality of spatial sensor outputs.

The controller 64 also receives the latched/unlatched state of at least the primary gate panel 12-A, indicated in FIG. 12 by a status signal from the primary gate panel 12-A latches. The controller 64 optionally (as indicated by the dashed line) also receives the latched/unlatched state of the inner gate panel 12-B. It is only when the primary gate panel 12-A is in the unlatched state that a collision hazard exists between the inner gate panel 12-B and an objected detected in the hazard space. Accordingly, it is only in response to detecting the object in the hazard space, and the primary gate panel 12-A being in its unlatched state (i.e., that the primary gate panel 12-A is in or moving towards its opened position), that the inner gate panel 12-B is disabled from entering its unlatched state.

A tailgate unlatching power circuit 68 receives control information from the vehicle 10, such as from a CAN node, the K9 BCM, or other controller. In response to the control information, the tailgate unlatching power circuit 68 supplies power selectively and individually to a first actuator 70 configured to unlatch the primary gate panel 12-A and second actuator 72 configured to unlatch the inner gate panel 12-B. For example, the tailgate unlatching power circuit 68 may supply power to the first and second actuators 70, 72 in response to button presses on the multi-panel tailgate 12, a key fob remote control, cockpit-mounted controls, or the like. FIG. 12 depicts the tailgate unlatching power circuit 68 as a functional block. In practice, the functionality of supplying power pulses to the unlatching actuators 70, 72 is subsumed in the vehicle 10 control system, such as the K9 BCM or the like.

The functionality of inhibiting power flow from the tailgate unlatching power circuit 68 to the second unlatching actuator 72 is represented by a switching element 74 interposed in an electrical path between these entities. In response to detecting an object in the hazard space and the primary gate panel 12-A being in its unlatched state, the controller 64 controls the switching element 74 to create an open circuit in the electrical path, thus inhibiting power flow from the unlatching power circuit 68 to the second unlatching actuator 72. By inhibiting power flow to the second unlatching actuator 72, the inner gate panel 12-B is disabled from unlatching, and hence it cannot pivot with respect to the primary gate panel 12-A. This prevents any collision between the inner gate panel 12-B and the object detected in the hazard space. In one embodiment, the switching element 74 comprises a relay. In another embodiment, the switching element 74 comprises a transistor. In some embodiments, the functionality of the switching element 74 may be implemented as control software in the tailgate unlatching power circuit 68—or more generally a vehicle 10 control system, such as the K9 BCM or the like—which inhibits the output of power to the second unlatching actuator 72 when an object is detected in the hazard space and the primary gate panel 12-A is in its unlatched state.

Note that, in response to detecting an object in the hazard space, the controller 64 disables only the inner gate panel 12-B from entering its unlatched state and pivoting with respect to the primary gate panel 12-A, and only if the primary gate panel 12-A is in its unlatched state (as a proxy for it being in the open position). If the primary gate panel 12-A is in its latched state (closed position), it remains enabled to enter its unlatched state and pivot with respect to the vehicle 10, even when an object is detected in the hazard space. This allows an operator to drive with a towing apparatus 16 installed, whether towing a vehicle or not, and still open the primary gate panel 12-A (together with the latched inner gate panel 12-B) to access the truck bed. In this case, the multi-panel tailgate 12 operates as a conventional, single-panel tailgate. The system 60 also allows the multi-panel tailgate 12 to retain a portion of the functionality of the inner gate panel 12-B even when an object is detected in the hazard space. Specifically, the inner gate panel 12-B can be moved between its latched and unlatched states when the primary gate panel 12-A is in its latched state.

Those of skill in the art will appreciate that FIG. 12 is a functional block diagram, the purpose of which is to convey the structure and operation of a tailgate deactivation system 60 to those of skill in the art, and does not necessarily represent actual circuit topology. In an embodiment where the tailgate deactivation system 60 is an aftermarket product to be retrofitted to existing vehicles 10, the block diagram of FIG. 12 may accurately describe the system 60. For example, it may include a controller 64 and memory 66, and a switching element 74 interposed between the tailgate unlatching power circuit 68 and the second unlatching actuator 72. However, in other embodiments, such as where the tailgate deactivation system 60 is incorporated into the vehicle 10 by the manufacturer, various functional elements depicted in FIG. 12, such as the controller 64, memory 66, and switching element 74, as well as the tailgate unlatching power circuit 68, may comprise software routines incorporated into the vehicle's control system.

Figure 13:
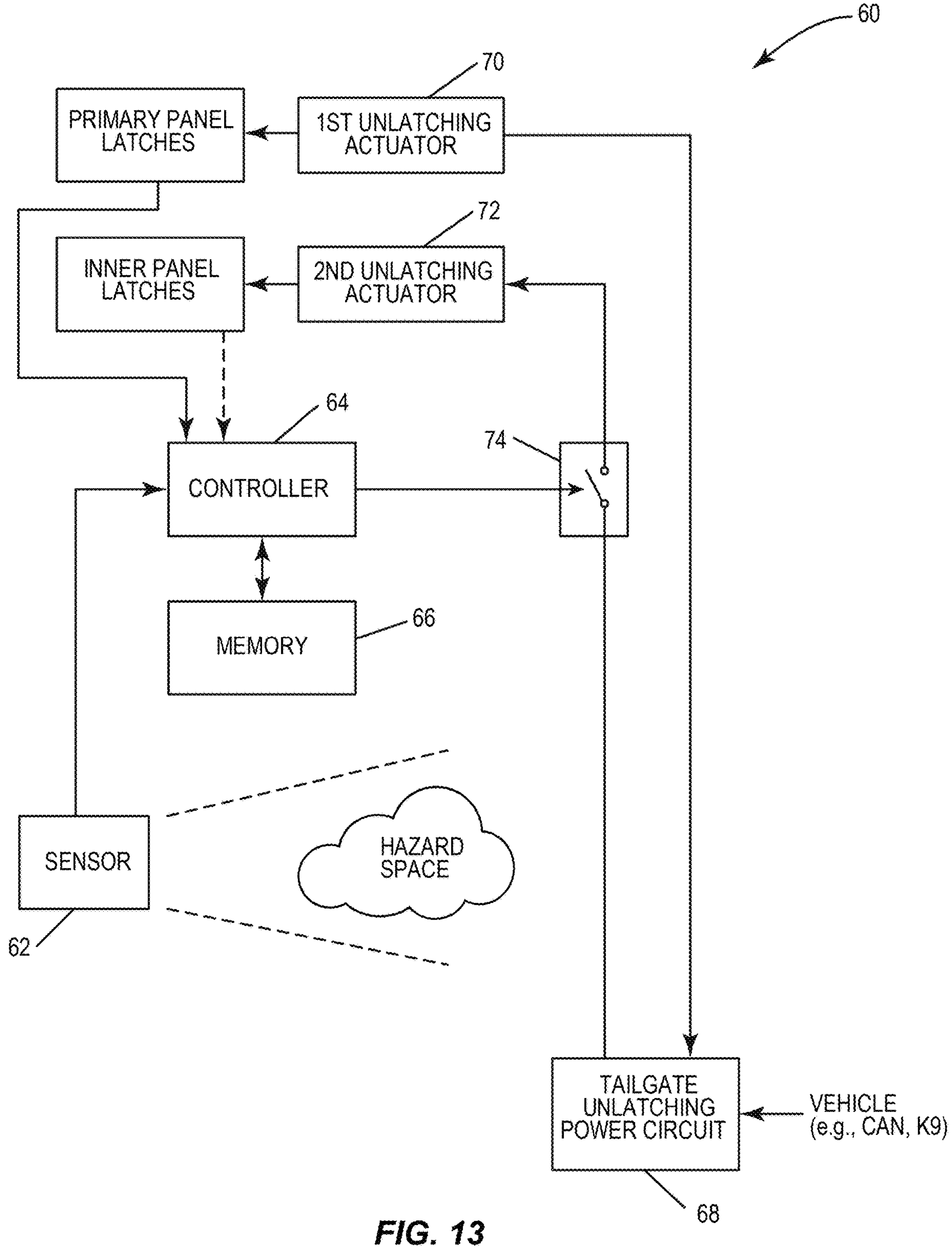
FIG. 13 is a functional block diagram of a tailgate deactivation system employing a spatial sensor.
Figure 14A:
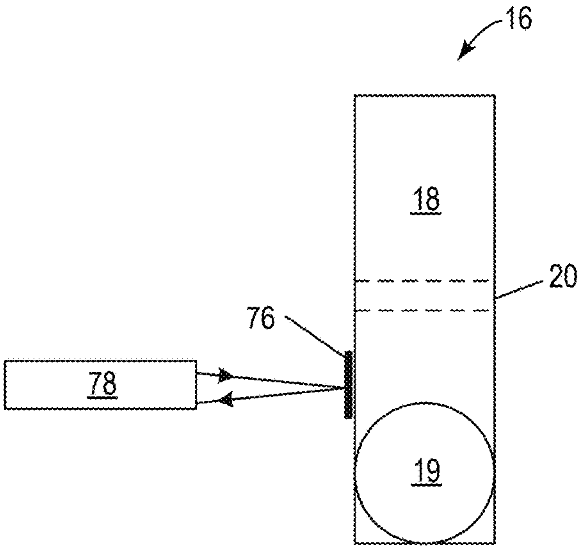
FIG. 14A is a block diagram of a tailgate deactivation system employing a reflection detection feature and a feature detecting sensor in the form of an optical or ultrasonic transceiver.
Figure 14B:
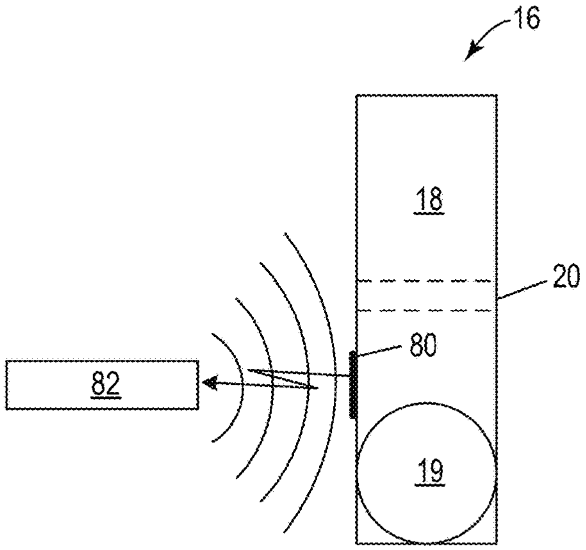
FIG. 14B is a block diagram of a tailgate deactivation system employing a detection feature in the form of an RFID tag and a feature detecting sensor in the form of an RFID reader.
Figure 14C:
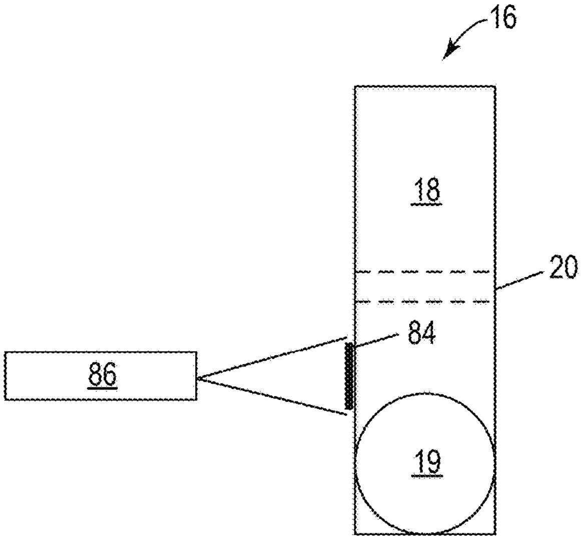
FIG. 14C is a block diagram of a tailgate deactivation system employing a detection feature in the form of an optical code and a feature detecting sensor in the form of an optical code reader.

FIGS. 13A-C depict embodiments of a tailgate deactivation system 60 in which a feature detecting sensor 78, 80, 82 monitors a predetermined area of a hazard space, and detects an object by detecting a detection feature 76, 80, 84 on the object. In FIGS. 13A-C, a towing apparatus 16 is depicted as a representative, but not limiting, object to be detected. In these embodiments, a detection feature 76, 80, 84 is affixed to an object, such as a towing apparatus 16. For example, the detection feature 76, 80, 84 may comprise an adhesive-backed sticker that is applied to the object. The detection feature 76, 80, 84 simplifies the task of the corresponding feature detecting sensor 78, 80, 82 by providing a specific target in a known location, which facilitates detection of the detection feature 76, 80, 84, and hence of the object to which it is affixed.

FIG. 13A depicts an embodiment of a tailgate deactivation system 60 in which the detection feature is a reflecting detection feature 76, which is configured to reflect an incident signal, and optionally to alter one or more properties of the reflected signal. In one embodiment, the feature detecting sensor 78 comprises an optical transmitter and receiver pair. In one embodiment, the feature detecting sensor 78 transmits a laser beam, and detects a reflected laser beam of substantially the same wavelength. The reflecting detection feature 76 comprises a surface that is reflective at the wavelength of the feature detecting sensor 78. The reflecting detection feature 76 is affixed to an object to be detected, such as the shaft 18 of a towing apparatus 16. The reflecting detection feature 76 may be affixed to the shaft 18 by adhesive, fasteners, or any suitable method (or it may be built in as a feature of the object). The feature detecting sensor 78 is positioned to illuminate the reflecting detection feature 76, and to receive and detect a reflection of the illumination. In the absence of the object (and hence the reflecting detection feature 76), the feature detecting sensor 78 will not detect a reflected beam. In some embodiments, to increase a Signal to Noise Ratio and hence the robustness of detection, the feature detecting sensor 78 may pulse, modulate, or otherwise condition the transmitted laser beam. In these embodiments, a corresponding pulsing, modulation, or the like of the reflected signal ensures it is a reflection of the transmitted signal, and not, e.g., random ambient light.

Although described herein as an optical transmitter and receiver, the feature detecting sensor 78 is not limited to this technology. For example, the feature detecting sensor 78 may emit and receive an ultrasonic signal, and the reflecting detection feature 76 may comprise a surface optimized to reflect ultrasonic energy. As another example, the feature detecting sensor 78 may comprise an inductive sensor including an oscillator configured to generate a high-frequency electromagnetic (EM) field. In this case, the reflecting detection feature 76 comprises a metal tripping plate that changes the EM field in predictable ways, depending on its distance, material, and size. The reflected EM signal, and in particular the changes in the EM field, is detected by the feature detecting sensor 78. Those of skill in the art will readily recognize other reflected signal technologies that will yield reliable detection of an object in the hazard space, using a feature detecting sensor 78 and corresponding reflecting detection feature 76 affixed to the object, given the teachings of the present disclosure.

FIG. 13B depicts an embodiment of a tailgate deactivation system 60 in which the feature detecting sensor 82 is a Radio Frequency Identification (RFID) reader, and the corresponding detection feature 76 is an RFID tag. As known in the art, an RFID reader emits an EM field. An inductive coil in an RFID tag extracts energy from the EM field, and powers an electronic circuit. The electronic circuit causes changes to the EM field in a predetermined (i.e. unique) sequence or code, referred to as backscatter modulation of the EM field. The RFID reader detects and decodes the backscatter modulated EM filed, and obtains the unique code of the RFID tag. In the embodiment of FIG. 13B, the range of the feature detecting sensor 82 comprising an RFID reader is set to be coextensive with the hazard space. By detecting backscatter modulation caused by the detection feature 76 comprising a corresponding RFID tag, the system 60 detects the presence of an object (to which the detection feature 76 is affixed) in the hazard space. In the absence of a detection feature 76 within the hazard space, the feature detecting sensor 82 no backscatter modulation, from which it concludes that no object is present in the hazard space.

FIG. 13C depicts an embodiment of a tailgate deactivation system 60 in which the feature detecting sensor 86 is an optical code reader, and the corresponding detection feature 84 is an optical code. Optical codes include barcodes, matrix codes (e.g., Quick Read, or QR, codes), and the like. The detection feature 84 may for example comprise an optical code printed on a sticker, which is affixed to an object, such as the shaft 18 of a towing apparatus 16.

In the embodiments of FIGS. 13B-C, the detection feature 80, 84 indicates the present of an object in the hazard space, and hence the tailgate deactivation system 60 can disable the inner gate panel 12-B from unlatching when the primary gate panel 12-A is in the unlatched state. Additionally, in these embodiments, the detection feature 80, 84 returns a unique code to the feature detecting sensor 82, 86. In these embodiments, the controller 64 of the tailgate deactivation system 60 can be programmed to selectively disable the inner gate panel 12-B based on the size or shape of the object in the hazard space, as well as the unlatched state of the primary gate panel 12-A. For example, a short towing apparatus 16, i.e. with a small hitch ball, may extend only a small distance past the end of the vehicle's hitch receiver tube 14, and may not present a collision hazard with the inner gate panel 12-B, despite being in the hazard space. In this case, the controller 64 may enable the inner gate panel 12-B to unlatch. However, upon the feature detecting sensor 82, 86 reading a code associated with a longer towing apparatus 16, i.e. with a larger hitch ball, and which extends into the hazard space sufficiently to cause a collision hazard with the inner gate panel 12-B, the controller 64 may disable the inner gate panel 12-B from unlatching, as described herein.

Embodiments of the present disclosure present numerous advantages over the prior art, and may achieve one or more of the following technical effects. By disabling an inner gate panel 12-B of a multi-panel tailgate 12 from unlatching in response to detecting an object in a hazard space that the inner gate panel 12-B would occupy when the primary panel 12-A is in the open position and the inner gate panel 12-B is in its unlatched state, collision damage to the inner gate panel 12-B and/or the object is prevented. The primary gate panel 12-A remains free to transition between latched and unlatched states, regardless of the detection of an object in the hazard space. Various approaches are described to detect the object in the hazard space, as well as to disallow the inner gate panel 12-B to unlatch by interrupting power an associated unlatching actuator.

In some embodiments, a method of operating a tailgate deactivation system of a vehicle having a tailgate assembly and a tailgate power circuit, the tailgate power circuit configured to supply power to cause the first gate panel to pivot with respect to a bed of the vehicle between a closed position and an opened position and to cause the second gate panel to pivot with respect to the first gate panel, includes detecting a presence of an object within a path of the second gate panel pivoting with respect to the first gate panel on a condition that the first gate panel is in the opened position. The method includes inhibiting power from flowing in a second portion of the tailgate power circuit to disable the second gate panel from pivoting with respect to the first gate panel on a condition that the object within the path of the second gate panel is detected. A flow of power is maintained in a first portion of the tailgate power circuit to enable the first gate panel to pivot with respect to the bed on the condition that the object within the path of the second gate panel is detected.

In some embodiments, the inhibiting power from flowing in the second portion of the tailgate power circuit to disable the second gate panel from pivoting with respect to the first gate panel is performed on a condition that A) the object within the path of the second gate panel is detected and B) the first gate panel is in the horizontal position.

In some embodiments, a method of operating a tailgate deactivation system of a vehicle having a tailgate assembly and a tailgate power circuit, the tailgate power circuit configured to supply power to cause the first gate panel to pivot with respect to a bed of the vehicle between a vertical position and a horizontal position and to cause the second gate panel to pivot with respect to the first gate panel, includes detecting a presence of an object within a path of the second gate panel pivoting with respect to the first gate panel on a condition that the first gate panel is in the horizontal position. The method further includes inhibiting power from flowing in a second portion of the tailgate power circuit to disable the second gate panel from pivoting with respect to the first gate panel on a condition that A) the object within the path of the second gate panel is detected and B) the first gate panel is in the horizontal position.

In some embodiments, a method of operating a tailgate deactivation system of a vehicle having a tailgate assembly and a tailgate power circuit, the tailgate power circuit configured to supply power to cause the first gate panel to pivot with respect to a bed of the vehicle between a closed position and an opened position and to cause the second gate panel to pivot with respect to the first gate panel, includes detecting a presence of an object within a path of the second gate panel pivoting with respect to the first gate panel on a condition that the first gate panel is in the opened position. The method includes inhibiting power from flowing in a second portion of the tailgate power circuit to disable the second gate panel from pivoting with respect to the first gate panel on a condition that A) the object within the path of the second gate panel is detected and B) the first gate panel is not in the closed configuration.

In some embodiments, the method includes receiving a user input (via an input/output system of the vehicle) and enabling, in response to the user input, the tailgate deactivation system.

In some embodiments, the method includes receiving a user input (via an input/output system of the vehicle) and disabling, in response to the user input, the tailgate deactivation system.

In some embodiments, the inhibiting power from flowing in a second portion of the tailgate power circuit to disable the second gate panel from pivoting with respect to the first gate panel is performed on a condition that A) the object within the path of the second gate panel is detected, B) the first gate panel is not in the closed configuration, and C) the tailgate deactivation system has been enabled.

Generally, all terms used herein are to be interpreted according to their ordinary meaning in the relevant technical field, unless a different meaning is clearly given and/or is implied from the context in which it is used.

Although the tailgate assembly 12 is described as including a primary gate panel 12-A and an inner gate panel 12-B, in other embodiments, any of the systems and methods described herein can be used in connection with any suitable multi-panel tailgate assembly. For example in some embodiments a tailgate assembly can include a first panel and second panel movable relative to the first panel and where the second panel is not inside, surrounded by or contained by the first panel. Such configurations can include, for example, a first panel and a second panel that have the same width.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first actuator" and "second actuator," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As used herein with respect to tailgate panel orientations, the terms "vertical" and "horizontal" have their conventional meanings, when referenced to a vehicle on a flat, level surface. For example, if a truck is on a steep incline, its closed tailgate is referred to as "vertical," even though it is not oriented in a plane perpendicular to the horizon, and its open tailgate is referred to as "horizontal," even though it is not parallel to the horizon. As used herein, the terms "latched" and "unlatched" mean "in the latched state" and "in the unlatched state," respectively. As used herein, the terms "latch" and "latching," when used as verbs, mean "transitioning from an unlatched state to a latched state." As used herein, the terms "unlatch" and "unlatching," when used as verbs, mean "transitioning from a latched state to an unlatched state."

As used herein, the term "configured to" means set up, organized, adapted, or arranged to operate in a particular way; the term is synonymous with "designed to," or with respect to processing circuitry, "programmed to."

The present disclosure may, of course, be carried out in other ways than those specifically set forth herein without departing from essential characteristics of the disclosure. The present aspects are to be considered in all respects as illustrative and not restrictive, and all changes coming within the meaning and equivalency range of the appended aspects are intended to be embraced therein.

What is claimed is:

1. A method of operating a vehicle having a multi-panel tailgate comprising a primary gate panel having a latched state when secured in a closed, vertical position and configured to pivot with respect to the vehicle in an unlatched state between the closed position and an open, horizontal position, and an inner gate panel having a latched state when secured in a closed position coplanar with the primary gate panel and configured to pivot with respect to the primary gate panel in an unlatched state between the closed position and an open position perpendicular to the plane of the primary gate panel, the vehicle further comprising a tailgate unlatching power circuit configured to selectively supply power to a first unlatching actuator to transition the primary gate panel from its latched to its unlatched state, and further configured to selectively supply power to a second unlatching actuator to transition the inner gate panel from its latched to its unlatched state, the method comprising:

detecting an object within a hazard space that the inner gate panel would occupy when the primary gate panel is in the open position and the inner gate panel is in the unlatched state;

ascertaining the state of the primary gate panel; and in response to detecting the object in the hazard space and the primary gate panel being in its unlatched state, disabling the inner gate panel from entering its unlatched state and pivoting with respect to the primary gate panel, by inhibiting power flow from the unlatching power circuit to the second unlatching actuator.

2. The method of claim 1 wherein detecting the object within the hazard space that the inner gate panel would occupy when the primary gate panel is in the open position and the inner gate panel is in the unlatched state comprises detecting actuation of a switch by the presence of a towing assembly in a towing assembly receiver of the vehicle.

3. The method of claim 2 wherein the switch is actuated by a hitch pin securing the towing assembly in the receiver.

4. The method of claim 1 wherein detecting the object within the hazard space that the inner gate panel would occupy when the primary gate panel is in the open position and the inner gate panel is in the unlatched state comprises receiving input from a user indicating the presence of the object in the hazard space.

5. The method of claim 4 wherein the user input comprises manual actuation of a switch.

6. The method of claim 1 wherein detecting the object within the hazard space that the inner gate panel would occupy when the primary gate panel is in the open position and the inner gate panel is in the unlatched state comprises monitoring the space by a spatial sensor and detecting the presence of an object by analysis of the spatial sensor output.

7. The method of claim 6 wherein analysis of the spatial sensor output comprises a comparison of the spatial sensor output to a stored reference spatial sensor output obtained with no object present in the hazard space.

8. The method of claim 6 wherein the spatial sensor is an infrared or visible light camera or video camera.

9. The method of claim 6 wherein the spatial sensor is one or more of a RADAR and LIDAR.

10. The method of claim 1 wherein detecting the object within the hazard space that the inner gate panel would occupy when the primary gate panel is in the open position and the inner gate panel is in the unlatched state comprises detecting a detection feature of the object by a feature detecting sensor.

11. The method of claim 10 wherein the detection feature is a reflecting detecting feature and the feature detecting sensor comprises a transmitter and receiver of an optical or ultrasonic signal.

12. The method of claim 10 wherein the detection feature is an optical code and the feature detecting sensor is a camera or optical sensor configured to read the optical code.

13. The method of claim 10 wherein the detection feature is a Radio Frequency Identification (RFID) tag, and the feature detecting sensor is an RFID reader.

14. The method of claim 1 wherein inhibiting power flow from the tailgate unlatching power circuit to the second unlatching actuator comprises creating an open circuit in an electrical path from the tailgate unlatching power circuit to the second unlatching actuator.

15. The method of claim 14 wherein creating an open circuit in an electrical path from the tailgate unlatching power circuit to the second unlatching actuator comprises:

- interposing a switching element in the electrical path between the tailgate unlatching power circuit to the second unlatching actuator; and
- controlling the switching element to assume an open circuit condition.

16. The method of claim 1 wherein inhibiting power flow from the unlatching power circuit to the second unlatching actuator comprises inhibiting the tailgate unlatching power circuit from sending power to the second unlatching actuator.

17. A tailgate deactivation system for a vehicle having a multi-panel tailgate comprising a primary gate panel having a latched state when secured in a closed, vertical position and configured to pivot with respect to the vehicle in an unlatched state between the closed position and an open, horizontal position, and an inner gate panel having a latched state when secured in a closed position coplanar with the primary gate panel and configured to pivot with respect to the primary gate panel in an unlatched state between the closed position and an open position perpendicular to the plane of the primary gate panel, the vehicle further comprising a tailgate unlatching power circuit configured to selectively supply power to a first unlatching actuator to transition the primary gate panel from its latched to its unlatched state, and further configured to selectively supply power to a second unlatching actuator to transition the inner gate panel from its latched to its unlatched state, the tailgate deactivation system comprising:

- a sensor configured to monitor a hazard space that the inner gate panel would occupy when the primary gate panel is in the open position and the inner gate panel is in the unlatched state;
- a controller configured to
  - receive an output of the sensor;
  - in response to the sensor output, detect an object within the hazard space;
  - ascertain the state of the primary gate panel; and
  - in response to detecting the object in the hazard space and the primary gate panel being in its unlatched state, disable the inner gate panel from entering its unlatched state and pivoting with respect to the primary gate panel, by inhibiting power flow from the unlatching power circuit to the second unlatching actuator.

18. The system of claim 17 wherein the sensor is a spatial sensor and wherein the controller is configured to detect the object by analysis of the spatial sensor output.

19. The system of claim 18 further comprising a memory operatively connected to the controller, and wherein the controller is configured to detect the object by analysis of the spatial sensor output by comparison of the spatial sensor output to a stored reference spatial sensor output obtained with no object present in the hazard space.

20. The system of claim 18 wherein the spatial sensor is an infrared or visible light camera or video camera.

21. The system of claim 18 wherein the spatial sensor is one or more of a RADAR and LIDAR.

22. The system of claim 17 wherein the sensor is a feature detecting sensor, and wherein the object comprises a detection feature.

23. The system of claim 22 wherein the detection feature is a signal reflection enhancement feature and the feature detecting sensor comprises a transmitter and receiver of an optical or ultrasonic signal.

24. The system of claim 22 wherein the detection feature is an optical code and the feature detecting sensor is a camera or optical sensor configured to read the optical code.

25. The system of claim 22 wherein the detection feature is a Radio Frequency Identification (RFID) tag, and the feature detecting sensor is an RFID reader.

26. The system of claim 17 further comprising a switching element interposed in an electrical path between the tailgate unlatching power circuit and the second unlatching actuator, and wherein the controller is configured to inhibit power flow from the unlatching power circuit to the second unlatching actuator by controlling the switching element to assume an open circuit condition.

27. The system of claim 17 wherein the controller is configured to inhibit power flow from the unlatching power circuit to the second unlatching actuator by inhibiting the tailgate unlatching power circuit from sending power to the second unlatching actuator.

* * * * *